(12) United States Patent (10) Patent No.: US 12,682,666 B2
Alahmari et al. (45) Date of Patent: Jul. 14, 2026

(54) AUTOMATED STEREOLOGY FOR DETERMINING TISSUE CHARACTERISTICS

(71) Applicants: UNIVERSITY OF SOUTH FLORIDA, Tampa, FL (US); STEREOLOGY RESOURCE CENTER, INC., Saint Petersburg, FL (US)

(72) Inventors: Saeed S. Alahmari, Tampa, FL (US); Dmitry Goldgof, Tampa, FL (US); Lawrence O. Hall, Tampa, FL (US); Peter R. Mouton, Tampa, FL (US)

( * ) Notice: Subject to any disclaimer, the term of this patent is extended or adjusted under 35 U.S.C. 154(b) by 147 days.

(21) Appl. No.: 17/397,891

(22) Filed: Aug. 9, 2021

(65) Prior Publication Data

US 2022/0058369 A1    Feb. 24, 2022

Related U.S. Application Data

(60) Provisional application No. 63/063,102, filed on Aug. 7, 2020.

(51) Int. Cl.
*G06K 9/00*        (2022.01)
*G02B 21/26*        (2006.01)
(Continued)

(52) U.S. Cl.
CPC ........... *G06V 20/693* (2022.01); *G02B 21/26* (2013.01); *G02B 21/367* (2013.01);
(Continued)

(58) Field of Classification Search
None
See application file for complete search history.

(56) References Cited

U.S. PATENT DOCUMENTS

| | | | |
|---|---|---|---|
| 8,482,733 B2 * | 7/2013 | Model | G01N 21/59 250/564 |
| 8,712,139 B2 * | 4/2014 | Rittscher | G06V 20/695 382/173 |

(Continued)

FOREIGN PATENT DOCUMENTS

| | | | | |
|---|---|---|---|---|
| CN | 111144443 A | * | 5/2020 | G06F 18/241 |
| WO | WO-2018089783 A1 | * | 5/2018 | G06K 9/0014 |
| WO | WO-2022178095 A1 | * | 8/2022 | G06N 20/00 |

OTHER PUBLICATIONS

Pesteie et al., "Adaptive Augmentation of Medical Data Using Independently Conditional Variational Auto-Encoders," in IEEE Transactions on Medical Imaging, vol. 38, No. 12, pp. 2807-2820, Dec. 2019, doi: 10.1109/TMI.2019.2914656. (Year: 2019).*

(Continued)

*Primary Examiner* — Chan S Park
(74) *Attorney, Agent, or Firm* — HUSCH BLACKWELL LLP

(57)        ABSTRACT

Systems and methods for automated stereology are provided. In some embodiments, an active deep learning approach may be utilized to allow for a faster and more efficient training of a deep learning model for stereology analysis. In other embodiments, existing deep learning models for stereology analysis may be re-tuned to develop greater accuracy for a given data set of interest, either with or without an active deep learning approach. A method can include: capturing a data set including a stack of images of a three-dimensional (3D) object; determining whether an existing deep learning model is appropriate for use on the stack of images (or for re-tuning); performing pre-processing on the data set; performing a training of a deep learning model; applying the deep learning model to obtain a confidence score for each label of the data set; reviewing, by a user, at least some labels in the active set to verify whether (Continued)

the label displays sufficient agreement with an expected result, and moving only those that display sufficient agreement to a training set; and performing a stereology analysis using the trained deep learning model.

17 Claims, 19 Drawing Sheets

(51) Int. Cl.

| | |
|---|---|
| *G02B 21/36* | (2006.01) |
| *G06F 18/20* | (2023.01) |
| *G06F 18/21* | (2023.01) |
| *G06F 18/214* | (2023.01) |
| *G06V 10/26* | (2022.01) |
| *G06V 10/30* | (2022.01) |
| *G06V 10/70* | (2022.01) |
| *G06V 10/82* | (2022.01) |
| *G06V 20/64* | (2022.01) |
| *G06V 20/69* | (2022.01) |

(52) U.S. Cl.
CPC ........ *G06F 18/214* (2023.01); *G06F 18/2178* (2023.01); *G06F 18/285* (2023.01); *G06V 10/267* (2022.01); *G06V 10/30* (2022.01); *G06V 10/70* (2022.01); *G06V 10/82* (2022.01); *G06V 20/64* (2022.01); *G06V 20/647* (2022.01); *G06V 20/695* (2022.01); *G06V 2201/03* (2022.01); *G06V 2201/10* (2022.01)

(56) References Cited

U.S. PATENT DOCUMENTS

| | | | | |
|---|---|---|---|---|
| 9,760,990 | B2 * | 9/2017 | Abedini | G06F 18/41 |
| 10,013,760 | B2 * | 7/2018 | Bhargava | G06T 7/0014 |
| 10,210,432 | B2 * | 2/2019 | Pisoni | G06F 18/217 |
| 10,643,107 | B1 * | 5/2020 | Yoo | G06N 3/08 |
| 10,949,961 | B1 * | 3/2021 | Narayanaswamy | G06T 5/50 |
| 10,956,523 | B2 * | 3/2021 | Huang | G06F 16/5838 |
| 10,990,856 | B1 * | 4/2021 | Yang | G06N 3/084 |
| 11,004,199 | B2 * | 5/2021 | Mouton | G06T 7/11 |
| 11,107,572 | B1 * | 8/2021 | Ganeshananthan | G06V 10/75 |
| 11,170,536 | B2 * | 11/2021 | Mikkola | G06N 3/04 |
| 11,276,498 | B2 * | 3/2022 | Schler | G06V 40/171 |
| 11,295,113 | B2 * | 4/2022 | Raczkowski | G06F 18/22 |
| 11,501,165 | B2 * | 11/2022 | Lin | G06N 3/08 |
| 11,561,224 | B2 * | 1/2023 | Shields | G01N 33/5743 |
| 11,574,166 | B2 * | 2/2023 | Ghosh | G06N 7/01 |
| 11,586,845 | B2 * | 2/2023 | Cohen | G06Q 30/0202 |
| 11,636,666 | B2 * | 4/2023 | Xue | G06V 10/82 |
| | | | | 382/201 |
| 11,804,025 | B2 * | 10/2023 | Rainbow | G06V 10/454 |
| 11,856,260 | B2 * | 12/2023 | Holm | G06V 10/764 |
| 11,908,132 | B2 * | 2/2024 | Bijalwan | G16H 30/40 |
| 11,923,091 | B2 * | 3/2024 | Schler | G06V 40/174 |
| 12,033,047 | B2 * | 7/2024 | Verma | G06N 3/047 |
| 2009/0027676 | A1 * | 1/2009 | Model | G01N 21/59 |
| | | | | 356/436 |
| 2009/0238457 | A1 * | 9/2009 | Rittscher | G06V 20/695 |
| | | | | 382/173 |
| 2016/0171682 | A1 * | 6/2016 | Abedini | G16H 30/20 |
| | | | | 382/132 |
| 2017/0358082 | A1 * | 12/2017 | Bhargava | G06V 20/69 |
| 2019/0005358 | A1 * | 1/2019 | Pisoni | G06V 10/82 |
| 2019/0012575 | A1 * | 1/2019 | Xiao | G06N 3/045 |
| 2019/0080012 | A1 * | 3/2019 | Huang | G06V 10/82 |
| 2019/0256817 | A1 * | 8/2019 | Gebhart | G01N 21/6428 |
| 2019/0272638 | A1 * | 9/2019 | Mouton | G06T 5/20 |
| 2019/0346446 | A1 * | 11/2019 | Shields | A61K 31/497 |
| 2019/0347557 | A1 * | 11/2019 | Khan | G06N 3/045 |
| 2020/0080046 | A1 * | 3/2020 | Gebhart | G01N 15/0612 |
| 2020/0098141 | A1 * | 3/2020 | Mikkola | G06V 10/44 |
| 2020/0302029 | A1 * | 9/2020 | Holm | H04N 21/44008 |
| 2020/0320343 | A1 * | 10/2020 | Cohen | G06N 20/00 |
| 2020/0320619 | A1 * | 10/2020 | Motaharian | G06Q 30/0185 |
| 2020/0342207 | A1 * | 10/2020 | Raczkowski | G06V 40/70 |
| 2021/0027055 | A1 * | 1/2021 | Rainbow | G06V 20/176 |
| 2021/0049345 | A1 * | 2/2021 | Johnson | G06F 18/214 |
| 2021/0279500 | A1 * | 9/2021 | Xue | G06V 10/764 |
| 2021/0279566 | A1 * | 9/2021 | Lin | G06F 18/23 |
| 2021/0343398 | A1 * | 11/2021 | Bijalwan | G06N 3/045 |
| 2021/0366613 | A1 * | 11/2021 | Schler | G06V 10/764 |
| 2021/0374500 | A1 * | 12/2021 | Ghosh | G06N 20/20 |
| 2022/0051146 | A1 * | 2/2022 | Verma | G06N 3/063 |
| 2022/0215289 | A1 * | 7/2022 | Mopur | G06N 3/045 |
| 2022/0292666 | A1 * | 9/2022 | Zhang | G06T 11/206 |
| 2022/0319153 | A1 * | 10/2022 | Iwaki | G06T 7/11 |
| 2023/0059768 | A1 * | 2/2023 | Schler | G06V 10/40 |
| 2023/0074296 | A1 * | 3/2023 | Wang | G06T 7/0012 |
| 2023/0165505 | A1 * | 6/2023 | Babaeizadeh | G06V 10/70 |
| | | | | 600/509 |
| 2023/0267611 | A1 * | 8/2023 | Shi | G06T 7/0012 |
| | | | | 382/159 |
| 2024/0164640 | A1 * | 5/2024 | Schler | A61B 5/7282 |
| 2024/0185411 | A1 * | 6/2024 | Niederer | G06V 10/82 |

OTHER PUBLICATIONS

Mahbod et al., "Investigating and Exploiting Image Resolution for Transfer Learning-based Skin Lesion Classification," 2020 25th International Conference on Pattern Recognition (ICPR), Milan, Italy, 2021, pp. 4047-4053, doi: 10.1109/ICPR48806.2021. 9412307 . (Year: 2021).*

CN-111144443-A (machine translation) (Year: 2020).*

Bradley et al., "Virtual Microscopy with Extended Depth of Field," Digital Image Computing: Techniques and Applications (DICTA'05), Queensland, Australia, 2005, pp. 35-35, doi: 10.1109/DICTA.2005. 87. (Year: 2005).*

Chen et al., "Deep Learning for Cardiac Image Segmentation: A Review." Front Cardiovasc Med. Mar. 5, 2020;7:25. doi: 10.3389/fcvm.2020.00025. PMID: 32195270; PMCID: PMC7066212. (Year: 2020).*

Roy et al., "An Automated Ensembled Deep Neural Network Approach towards Accurate Segmentation of Biomedical Images," 2019 International Conference on Wireless Communications Signal Processing and Networking (WiSPNET), Chennai, India, 2019, pp. 240-245, doi: 10.1109/WiSPNET45539.2019.9032725. (Year: 2019).*

Peng et al., "Adaptive Image Enhancement for Fluorescence Microscopy," 2010 International Conference on Technologies and Applications of Artificial Intelligence, Hsinchu, Taiwan, 2010, pp. 9-16 (Year: 2010).*

Breuel, "Representations and metrics for off-line handwriting segmentation," Proceedings Eighth International Workshop on Frontiers in Handwriting Recognition, Niagra-on-the-Lake, ON, Canada, 2002, pp. 428-433 (Year: 2002).*

Abadi et al., Tensorflow: Large-Scale Machine Learning on Heterogeneous Distributed Systems, arXiv:1603.04467, 2016, pp. 1-19.

Alahmari et al., Iterative Deep Learning Based Unbiased Stereology with Human-in-the-Loop, In 2018 17th IEEE International Conference on Machine Learning and Applications (ICMLA), pp. 665-670.

Alahmari et al., Automated Cell Counts on Tissue Sections by Deep Learning and Unbiased Stereology, Journal of Chemical Neuroanatomy, 2019, 96:94-101.

Bradley et al., A One-Pass Extended Depth of Field Algorithm Based on the Over-Complete Discrete Wavelet Transform, Image and Vision Computing '04 New Zealand (IVCNZ'04), pp. 279-284.

Burke et al., Knowing What Counts: Unbiased Stereology in the Non-Human Primate Brain, JoVE (Journal of Visualized Experiments), 2009, 27:e1262.

Chollet et al., Keras: Deep Learning for Humans, https://github.com/fchollet/keras, 2015, 6 pages.

Gundersen et al., Stereology of Arbitrary Particles: A Review of Unbiased Number and Size Estimators and the Presentation of Some New Ones, in Memory of William R. Thompson, Journal of Microscopy, 1986, 143(1):3-45.

(56) References Cited

OTHER PUBLICATIONS

Hinton et al., Reducing the Dimensionality of Data with Neural Networks, Science, 2006, 313(5786):504-507.
Huang et al., Snapshot Ensembles: Train 1, Get M for Free, arXiv 1704.00109, 2017, pp. 1-14.
Kingma et al., Adam: A Method for Stochastic Optimization, In International Conference on Learning Representations (ICLR), 2015, pp. 1-15.
Krizhevsky et al., ImageNet Classification with Deep Convolutional Neural Networks, Advances in Neural Information Processing Systems, 2012, pp. 1097-1105.
LeCun et al., Deep Learning, Nature, 2015, 521(7553):436-444.
Litjens et al., A Survey on Deep Learning in Medical Image Analysis, arXIV:1702.05747, 2017, pp. 1-38.
Liu, Active Learning with Support Vector Machine Applied to Gene Expression Data for Cancer Classification, Journal of Chemical Information and Computer Sciences, 2004, 44(6):1936-1941.
Mouton et al., Unbiased Estimation of Cell Number Using the Automatic Optical Fractionator, Journal of Chemical Neuroanatomy, 2017, 80:A1-A8.
Nair et al., Rectified Linear Units Improve Restricted Boltzmann Machines, Proceedings of the 27th International Conference on Machine Learning (ICML-10), 2010, pp. 807-814.
Phoulady et al., Automatic Ground Truth for Deep Learning Stereology of Immunostained Neurons and Microglia in Mouse Neocortex, Journal of Chemical Neuroanatomy, 2019, 98:1-7.
Ronneberger et al., U-Net: Convolutional Networks for Biomedical Image Segmentation, In International Conference on Medical Image Computing and Computer-Assisted Intervention, 2015, pp. 234-241.
Santacruz et al., Tau Suppression in a Neurodegenerative Mouse Model Improves Memory Function, Science, 2005, 309(5733):476-481.
Saper, Any Way You Cut It: A New Journal Policy for the Use of Unbiased Counting Methods, Journal of Comparative Neurology, 1996, 364:5.
Savitzky et al., Smoothing and Differentiation of Data by Simplified Least Squares Procedures, Analytical Chemistry, 1963, 36(8):1627-1639.
Settles, Active Learning Literature Survey, University of Wisconsin—Madison, Department of Computer Sciences, Technical Report #1648, Jan. 2009, 47 pages.
Simard et al., Best Practices for Convolutional Neural Networks Applied to Visual Document Analysis, In ICDAR, 2003, 3:958-962.
Sommer et al., ilastik: Interactive Learning and Segmentation Toolkit, In 2011 IEEE International Symposium on Biomedical Imaging: From Nano to Macro, pp. 230-233.
Spires et al., Region-Specific Dissociation of Neuronal Loss and Neurofibrillary Pathology in a Mouse Model of Tauopathy, American Journal of Pathology, 2006, 168(5):1598-1607.
Srivastava et al., Dropout: A Simple Way to Prevent Neural Networks from Overfitting, Journal of Machine Learning Research, 2014, 15(1):1929-1958.
Sterio, The Unbiased Estimation of Number and Sizes of Arbitrary Particles Using the Disector, Journal of Microscopy, 1984, 134(2):127-136.
Tong et al., Support Vector Machine Active Learning for Image Retrieval, In Proceedings of the Ninth ACM International Conference on Multimedia, 2001, pp. 107-118.
Tong et al., Support Vector Machine Active Learning with Applications to Text Classification, Journal of Machine Learning Research, 2001, 2:45-66.
Top et al., Active Learning for Interactive 3D Image Segmentation, In International Conference on Medical Image Computing and Computer-Assisted Intervention, 2011, pp. 603-610.
Valdecasas et al., On the Extended Depth of Focus Algorithms for Bright Field Microscopy, Micron, 2001, 32(6):559-569.
Vezhnevets et al., Active Learning for Semantic Segmentation with Expected Change, In 2012 IEEE Conference on Computer Vision and Pattern Recognition, pp. 3162-3169.
West et al., Unbiased Stereological Estimation of the Total Number of Neurons in the Subdivisions of the Rat Hippocampus Using the Optical Fractionator, The Anatomical Record, 1991, 231(4):482-497.

* cited by examiner

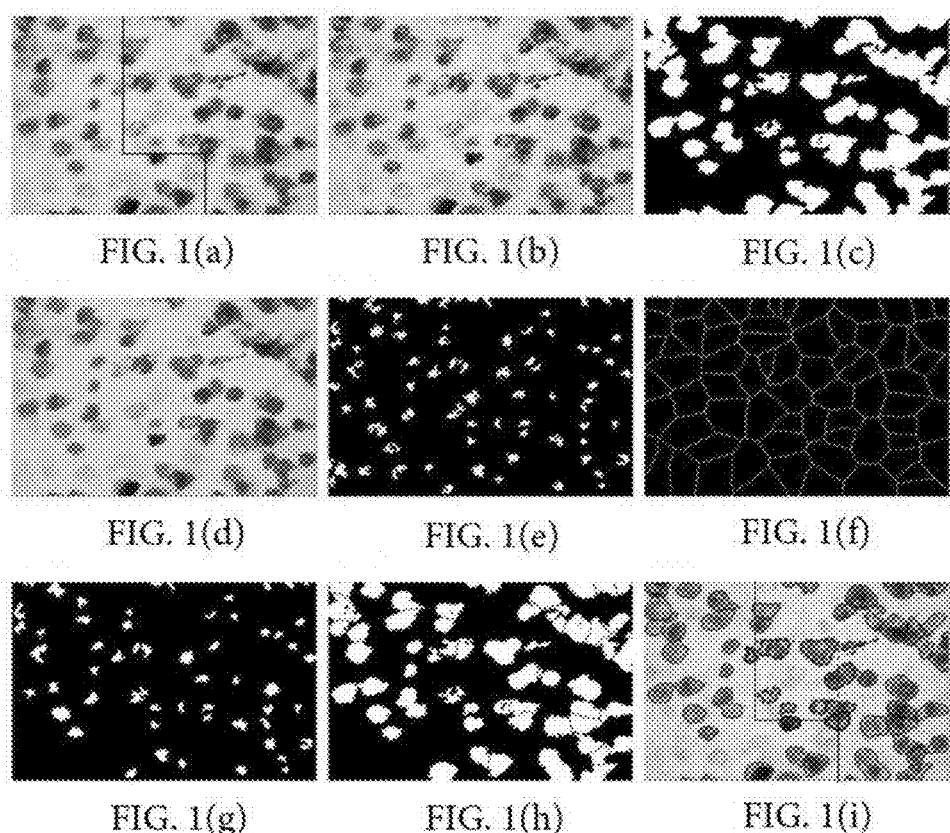
FIG. 1(a)       FIG. 1(b)       FIG. 1(c)
FIG. 1(d)       FIG. 1(e)       FIG. 1(f)
FIG. 1(g)       FIG. 1(h)       FIG. 1(i)
FIGURE 1. INTERMEDIATE RESULTS OF DIFFERENT STEPS IN SEGMENTATION-STEREOLOGY APPROACH: (a)
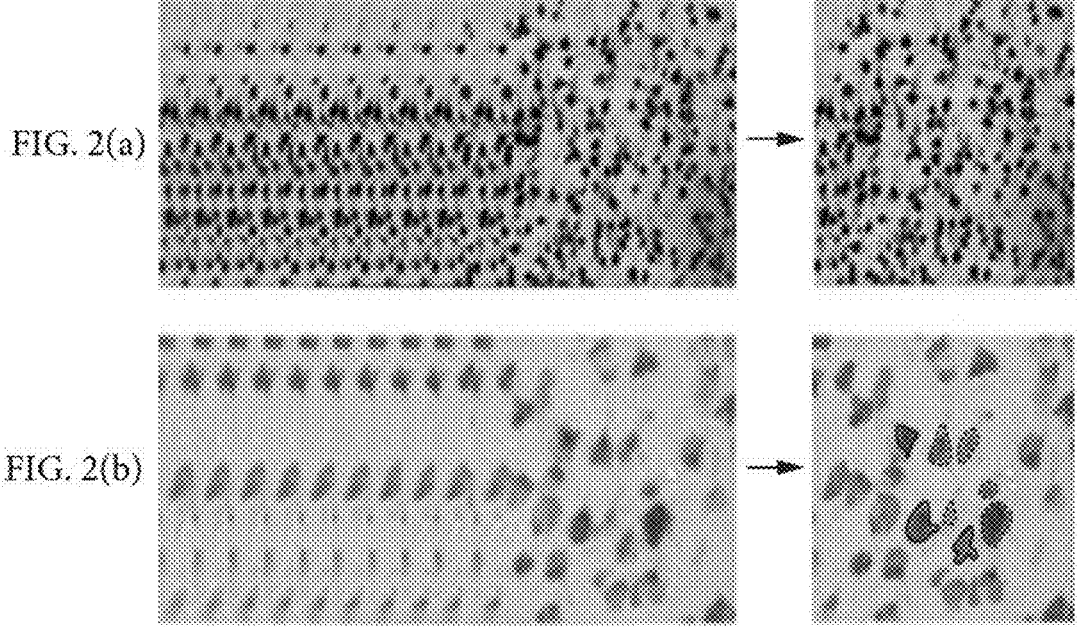
FIG. 2(a)
FIG. 2(b)

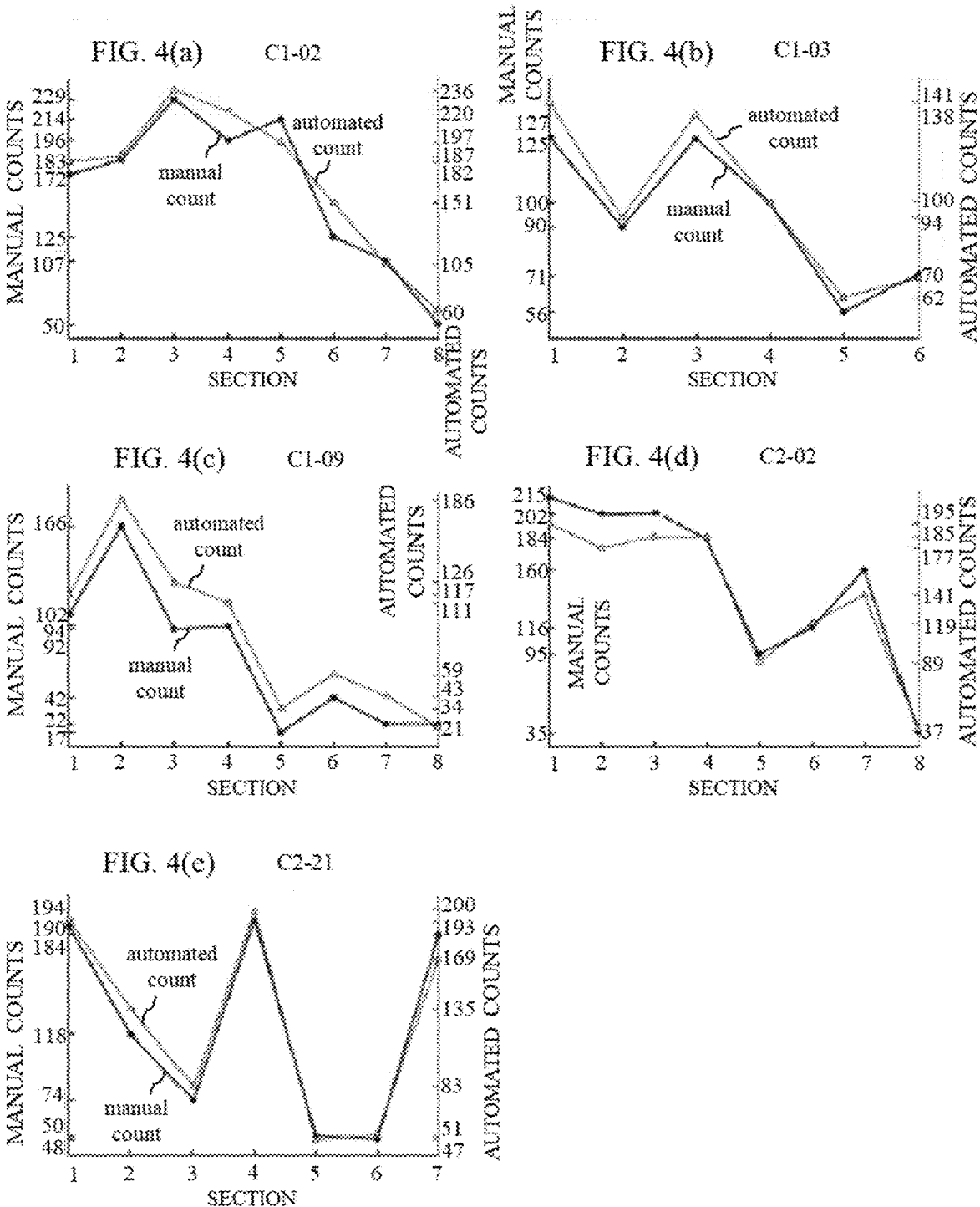
FIG. 4(a)    C1-02
FIG. 4(b)    C1-03
FIG. 4(c)    C1-09
FIG. 4(d)    C2-02
FIG. 4(e)    C2-21

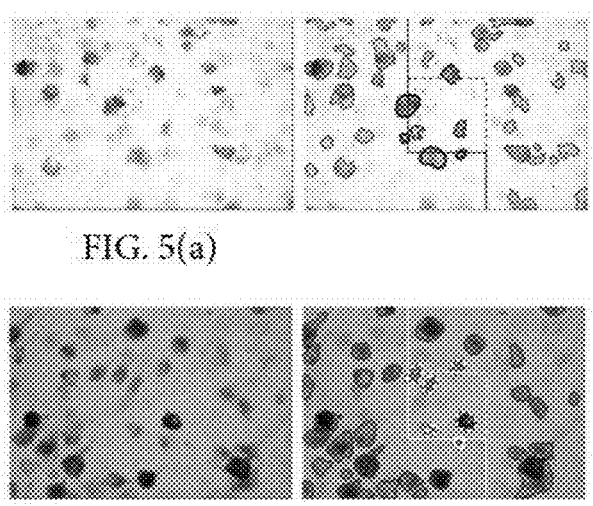
FIG. 5(a)
FIG. 5(b)
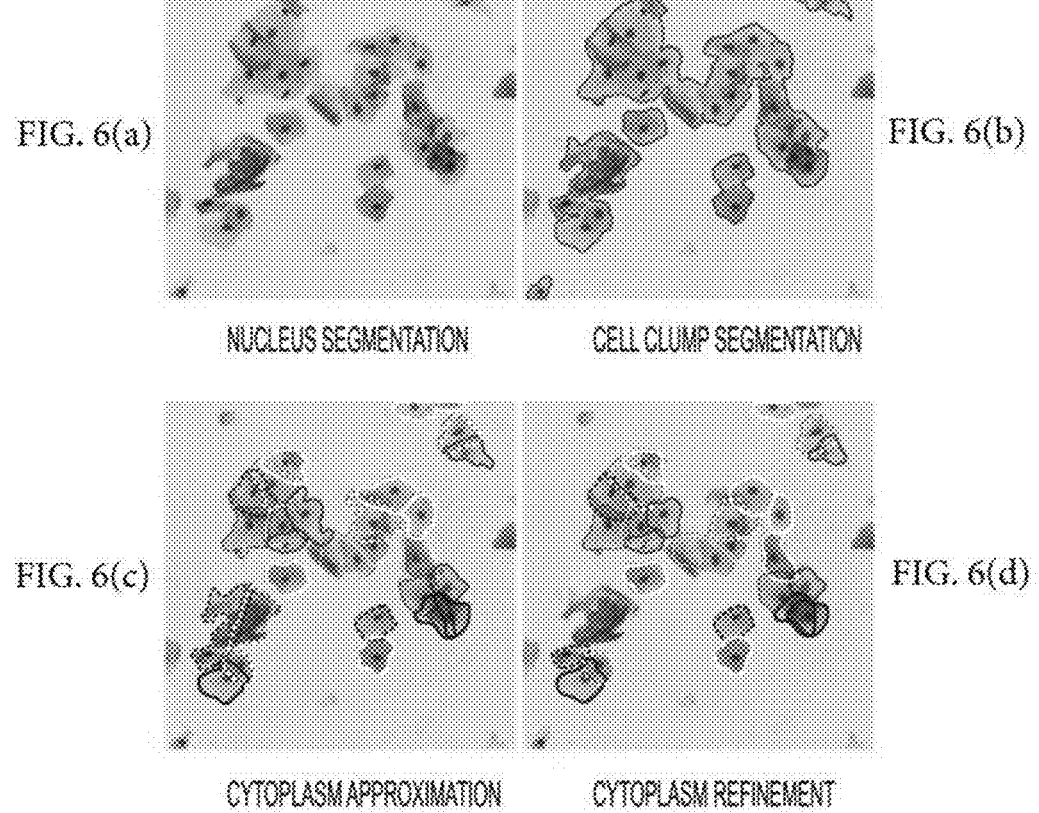
FIG. 6(a)
NUCLEUS SEGMENTATION
FIG. 6(b)
CELL CLUMP SEGMENTATION
FIG. 6(c)
CYTOPLASM APPROXIMATION
FIG. 6(d)
CYTOPLASM REFINEMENT

FIG. 7

```
    Input : EDF image I, min nucleus size m,  min solidity s, low threshold t₁, high
            threshold t₂ and min area and outer boundary average intensity
            difference d
    Output: Binary mask of nucleus segmentation N
 1  N ← ∅
 2  I ← Wiener (I)
 3  for t ← t1 to t2 step 10 do
 4      B ← I ≤ t
 5      foreach region r in B do
 6          if size of r < m or solidity of r < s then
 7              remove r
 8          else if binary mask of r ∩ N = ∅ then
 9              N ← N ∪ r
10          else
                /* r overlaps with regions r₁, r₂,...,rₙ in N           */
11              if solidity of r ≥ solidities of all regions r₁, r₂,...,rₙ then
12                  N ← N ∪ r
13              else
14                  remove r
15              end
16          end
17      end
18  end
19  foreach region r in N do
20      dilate r
21      if average intensity of r – average intensity of outer boundary < d then
22          remove r
23      end
24  end
```

FIG. 8

$$Q(q) = \inf\left\{ x \in \mathbb{R}, q \le \frac{1}{\sqrt{2\pi}\sigma_b} e^{-\frac{(z-\mu_b)^2}{2\sigma_b^2}} \right\} \tag{1}$$
$$= \mu_b + \sqrt{2}\sigma_b \, \mathrm{erf}^{-1}(2q-1),$$

$$S_{ij}^{i'j'} = \sqrt{\sum_{k=1}^{20} \left( \overline{f_{ij}^k} - \overline{f_{i'j'}^k} \right)^2}. \tag{2}$$

$$C_{ij}^{i'j'} = \sqrt{(i-i')^2 + (j-j')^2}, \tag{3}$$

$$L_{ij}^{i'j'} = \exp\left( -\frac{C_{ij}^{i'j'2} + S_{ij}^{i'j'2}}{2\alpha^2} \right). \tag{4}$$

$$L_{ij}^m = \frac{1}{m'}\left( \sum_{s=1}^{m'} L_{ij}^{i_s j_s} \right), \tag{5}$$

$$\beta L_{ij}^m \cdot \sum_{\substack{n=1 \\ n \ne m}}^{N} L_{ij}^n > 0. \tag{6}$$

$$W_\theta = \left( \frac{1}{1 + \exp\left( -\alpha\left( \frac{1}{2} - \frac{|\rho-s|}{r_\theta} \right) \right)} \right)_{s=0}^{2r_\theta}, \tag{7}$$

$$I\left(\rho_\theta^{s+1}\right) - I\left(\rho_\theta^{s-1}\right), \tag{8}$$

$$i_\theta = \arg\max_{s \in \{0,1,\dots 20\}} W_\theta(s)G(\rho_\theta, s). \tag{9}$$

$$DSC_{A,B} = \frac{2|A \cap B|}{|A| + |B|}, \tag{10}$$

$$\frac{|A \cap B|}{\max\{|A|,|B|\}} > 0.6. \tag{11}$$

HISTOGRAM OF PIXEL INTENSITIES
-- GAUSSIAN MODELING FOREGROUND PIXEL INTENSITIES
— GAUSSIAN MODELING BACKGROUND PIXEL INTENSITIES
..... THE THRESHOLD AT QUANTILE 0.06 OF BACKGROUND GAUSSIAN 230.4    255

FIG. 11
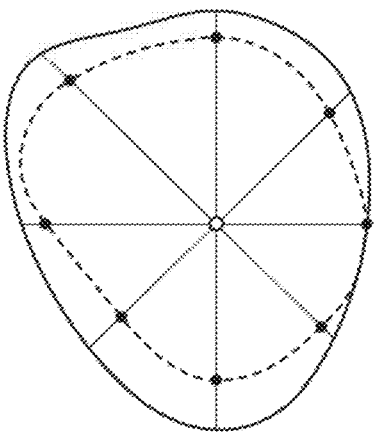
FIG. 12
FIGURE 2. CORPUSCLE PROBLEM
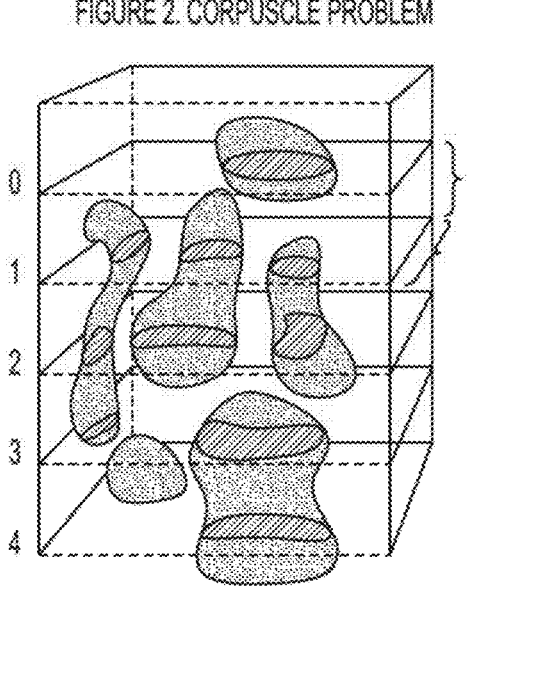
SIX OBJECTS
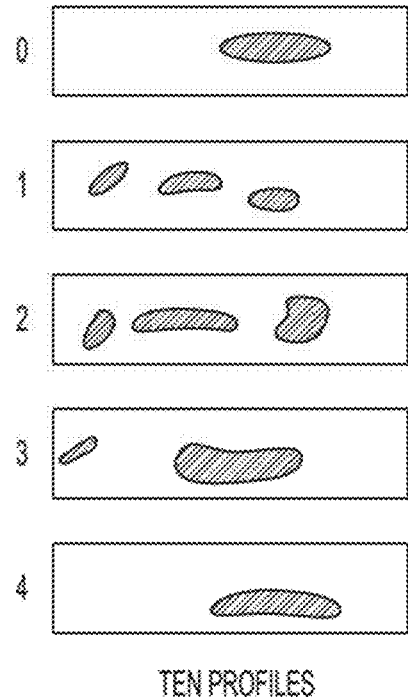
TEN PROFILES FIGURE 4. EDF IMAGES OF GFAP ASTROCYTES (UPPER) AND Iba-1 MICROGLIA (LOWER) AT HIGH POWER (100x OIL na 1.3).

FIG. 14
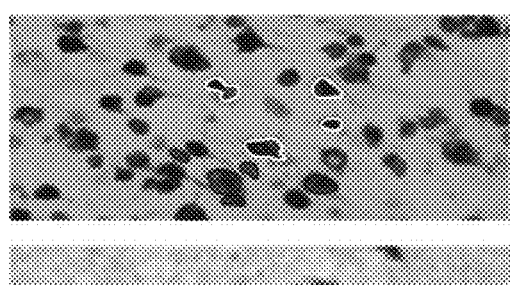
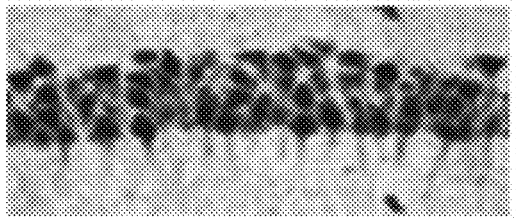
FIG. 15
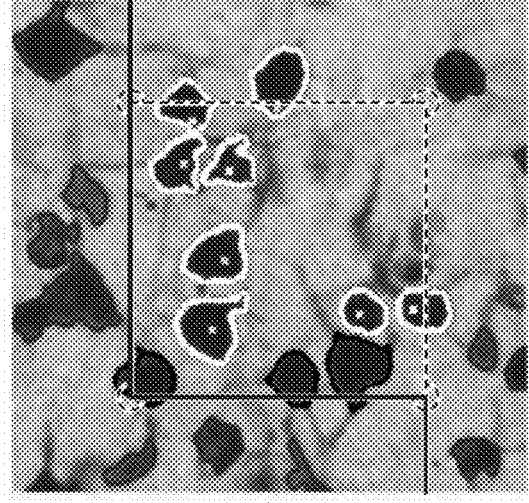

FIGURE 8. OUTLINED REFERENCE SPACE ON TISSUE SECTIONS OF MOUSE BRAIN.

FIGURE 9. SCHEMATIC SHOWING STACKS OF Z-AXIS IMAGES (DISECTOR STACKS) AT SYSTEMATIC-RANDOM LOCATIONS.

FIG. 18

| NAME | EDF IMAGE | MASK FROM ANNOTATED IMAGE | PREDICTED SEGMENTATION | DICE COEFFICIENT |
|---|---|---|---|---|
| LU-40-Section5-Stack7 | | | | 6,934 |
| LU-20-Section5-Stack4 | | | | 6,957 |
| LU-0-Section5-Stack2 | | | | 6,913 |

FIGURE 10: RESULTS FOR PREDICTED SEGMENTATION OF EDF IMAGES USING THE CNN.

FIG. 19

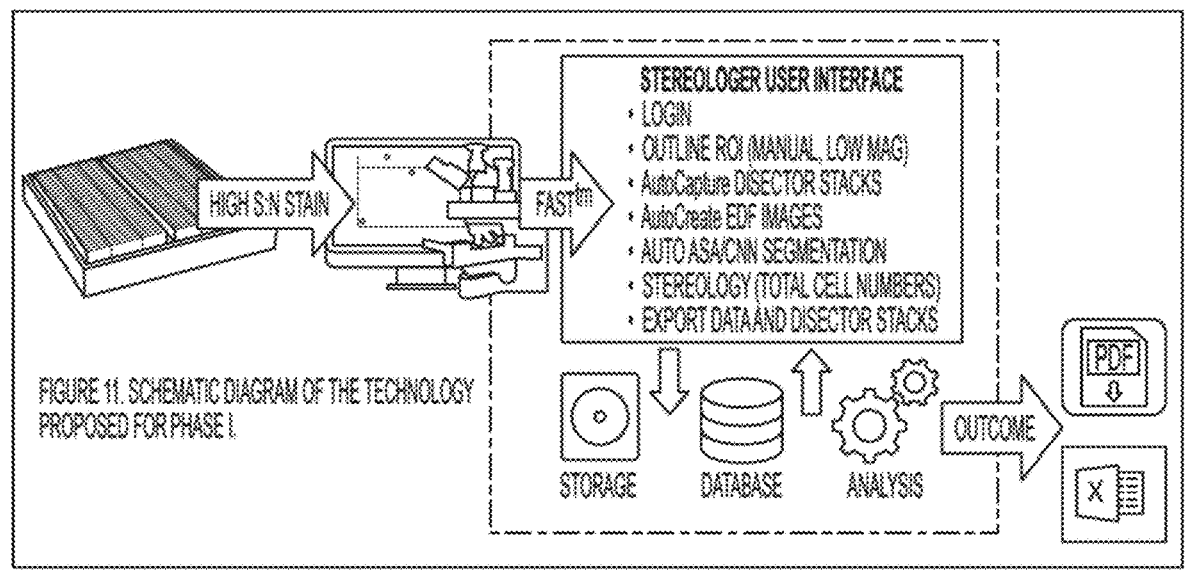

STEREOLOGER USER INTERFACE
· LOGIN
· OUTLINE ROI (MANUAL, LOW MAG)
· AutoCapture DISECTOR STACKS
· AutoCreate EDF IMAGES
· AUTO ASA/CNN SEGMENTATION
· STEREOLOGY (TOTAL CELL NUMBERS)
· EXPORT DATA AND DISECTOR STACKS

HIGH S:N STAIN

FAST™

STORAGE    DATABASE    ANALYSIS    OUTCOME    PDF    X

FIGURE 11. SCHEMATIC DIAGRAM OF THE TECHNOLOGY PROPOSED FOR PHASE I.

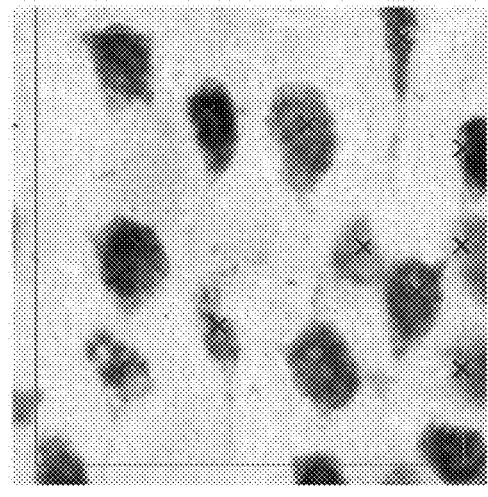
FIG. 21(a) Manual annotation
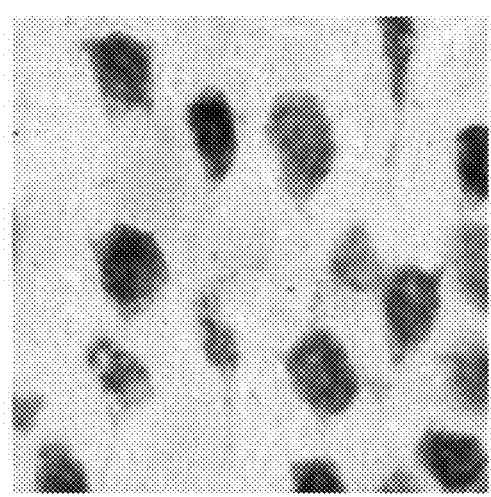
FIG. 21(b) EDF image
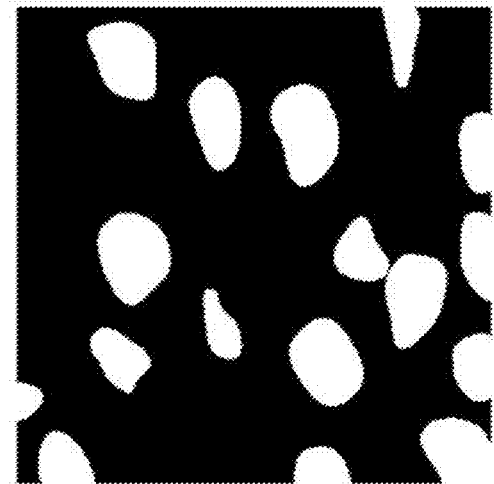
FIG. 21(c) ASA mask

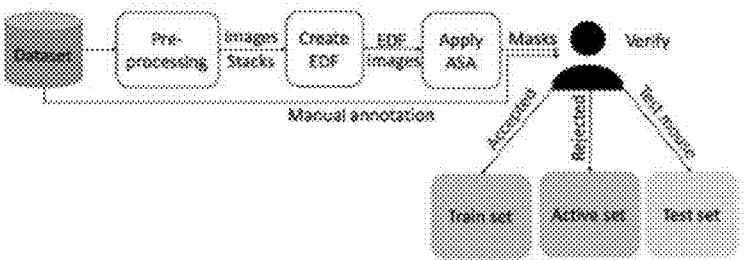
FIG. 22(a) Initial masks created using ASA followed by human verification
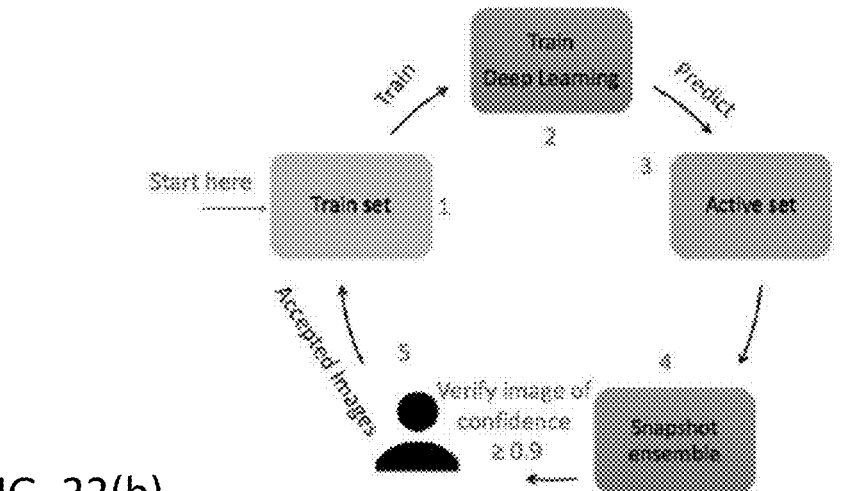
FIG. 22(b) Active deep learning approach where human verifies predicted masks of confidence = 0.9 or higher
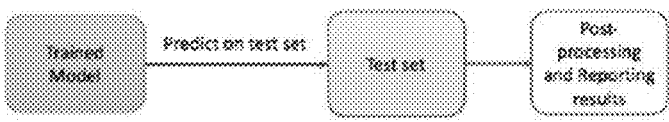
FIG. 22(c) Testing and post-processing step FIG. 24(a) ASA        FIG. 24(b) Deep learning FIG. 24(c) ASA        FIG. 24(d) Deep learning FIG. 24(e) ASA        FIG. 24(f) Deep learning FIG. 24(g) ASA        FIG. 24(h) Deep learning

AUTOMATED STEREOLOGY FOR DETERMINING TISSUE CHARACTERISTICS

CROSS REFERENCE TO RELATED APPLICATION

This patent application claims priority from and benefit of the U.S. Provisional Patent. Application No. 63/063,102 filed on Aug. 7, 2020. The disclosure of the above-identified patent application is incorporated herein by reference in its entirety for all purposes.

STATEMENT OF GOVERNMENT SUPPORT

This invention was made with government support under 17465 and 1926990 awarded by the National Institutes of Health. The government has certain rights to the invention.

TECHNOLOGICAL FIELD

The present invention relates to automated stereology methods and apparatuses. More specifically, the present invention relates to methods and apparatus for determining the characteristics of a tissue sample, including the number and size of cells.

BACKGROUND OF THE INVENTION

Unbiased stereology is used to quantify properties of higher dimensional (e.g., 3D) objects using lower dimensional (e.g., 2D) sections of the object. Computer based stereology systems acquire data from 3D structures and have been developed to extract an unbiased estimation of geometric properties including length, area, volume, and population size of objects within a biological sample. Biological applications of stereology include the unbiased estimation of a regional volume of tissue, surface area and length of cells and curvilinear fibers, and the total number of cells (objects of interest) in a defined reference space (region of interest).

Design-based (unbiased) stereology is the current best practice for quantifying the number of cells in a tissue sample. The majority of funding agencies, journal editors, and regulatory bodies prefer the sound mathematical basis of stereology approaches over assumption- and model-based methods. The major obstacle to high throughput applications is that current stereology approaches require time- and labor-intensive manual data collection, which can be prohibitive on tissue samples that include multiple cell types. For example, section or slice thickness determination may be carried out by a user performing manual adjustments using the microscope's fine focusing mechanism to locate the boundaries of slice. In addition, a user may also be required to manually locate and select objects of interest while stepping through stained tissue sections in order to perform quantitative analysis of biological microstructures. Therefore, there is a continuing need to reduce the number of manual steps required, as well as increase the efficiency and accuracy of automated stereology.

BRIEF SUMMARY OF THE INVENTION

Embodiments of the present invention include systems and methods for automated stereology. Embodiments of the present invention include an automatic optical fractionator that can obtain accurate and efficient stereology-based estimates of the number and size of biological objects (e.g., cells) in tissue sections. Methods and systems of automated stereology utilizing deep learning are also provided.

A method according to the present invention can include providing an imager for capturing a Z-stack of images of a three-dimensional (3D) object, the Z-stack of images being a sequence of images of the 3D object captured in increments having a step size along a z-axis of the 3D object; constructing extended depth of field (EDF) images from the Z-stack of images; performing a segmentation method on the EDF images including estimating a Gaussian Mixture Model (GMM), performing morphological operations, performing watershed segmentation, constructing Voronoi diagrams and performing boundary smoothing; and determining one or more stereology parameters such as number of cells in a region.

An embodiment of the present invention includes a method for performing computerized stereology. The method can include constructing extended depth of field (EDF) images from the Z-stack of images; performing clump segmentation on the EDF images by binarizing the EDF images using a threshold determined by estimating a Gaussian Mixture Model to pixel intensities; preprocessing the EDF images by converting the EDF images into grayscale and opening by reconstruction followed by closing by reconstruction; performing watershed segmentation on the EDF images, wherein regional minimas are extracted as foreground markers and boundaries between regions are used as background markers, and the watershed segmentation is applied using the background and foreground makers that overlap with clumps; constructing Voronoi diagrams and smoothing, including constructing a Voronioi map using centers of foreground regions and refining region boundaries using a Savitzy-Golay filter; and determining one or more stereology parameters, such as number and size of cells in a region.

In an embodiment of the subject invention, a method of performing computerized stereology can comprise: i) capturing (e.g., by an imager) a data set comprising a stack of images of a three-dimensional (3D) object, the stack of images being a sequence of images of the 3D object captured in increments having a step size along an axis of the 3D object; ii) performing (e.g., by a processor that can be in operable communication with the imager) pre-processing on the data set to convert each image of the stack of images to gray and applying at least one algorithm to the data set to create a single image of the stack and to segment the single image into segments and provide respective labels for the segments; iii) performing (e.g., by the processor) a training of a deep learning model using a deep neural network to generate a snapshot ensemble comprising a plurality of snapshot models saved periodically during the training, wherein the training of the deep learning model results in a trained deep learning model; iv) applying (e.g., by the processor) the snapshot ensemble to predict an active set and compute a confidence score for each label of the respective labels for the segments, wherein each label with a confidence score that exceeds a predetermined threshold is moved to the active set; v) reviewing (e.g., by a human user) all labels in the active set to verify whether the label displays sufficient agreement with an expected value, wherein labels verified by the user to display sufficient agreement are moved to a train set and labels rejected by the user as not displaying sufficient agreement remain in the active set; and vi) performing (e.g., by the processor) a testing process on the train set using the trained deep learning model. The at least one algorithm applied to the data set can comprise an adaptive segmentation algorithm (ASA), an extended depth of field (EDF) algorithm, or both. The labels can be segmentation masks, and the snapshot ensemble can comprise the plurality of snapshot models saved every five epochs during the training. The predetermined threshold can be 0:9, and steps iii), iv), and v) can be repeated a plurality of times (e.g., at least five times) before step vi) is performed. The deep learning model can comprise a convolutional neural network (CNN). The method can further comprise: vii) performing (e.g., by the processor) a post-processing step on the train set to remove noise, apply unbiased stereology rules, and apply a watershed algorithm.

In another embodiment, a system for performing computerized stereology can comprise: an imager configured to capture a stack of images of a three-dimensional (3D) object, the stack of images being a sequence of images of the 3D object, and the imager being configured to capture the sequence of images of the 3D object in increments having a step size along an axis of the 3D object; a processor in operable communication with the imager; and a computer-readable medium in operable communication with the processor and having instructions stored thereon that, when executed, cause the processor to perform the following steps: i) perform preprocessing on the data set to convert each image of the stack of images to gray and applying at least one algorithm to the data set to create a single image of the stack and to segment the single image into segments and provide respective labels for the segments; ii) perform a training of a deep learning model using a deep neural network to generate a snapshot ensemble comprising a plurality of snapshot models saved periodically during the training, wherein the training of the deep learning model results in a trained deep learning model; iii) apply the snapshot ensemble to predict an active set and compute a confidence score for each label of the respective labels for the segments, wherein each label with a confidence score that exceeds a predetermined threshold is moved to the active set; iv) allow a user to review all labels in the active set to verify whether the label displays sufficient agreement with an expected value, wherein labels verified by the user to display sufficient agreement are moved to a train set and labels rejected by the user as not displaying sufficient agreement remain in the active set; and v) perform a testing process on the train set using the trained deep learning model.

In another embodiment, a method of performing computerized stereology is provided. The method comprises: obtaining a data set comprising a stack of images representing sections of a three-dimensional (3D) object; pre-processing the stack of images using segmentation and focus algorithms; determining whether an existing deep learning model matches the stack of images; if an existing deep learning model is not available for the stack of images: (i) training a deep learning model using a training set of the pre-processed stack of images, wherein the training of the deep learning model results in an initial trained deep learning model; (ii) applying the initial trained deep learning model to at least a portion of an active set of the stack of images, and computing at least one confidence score for at least one predicted label of each image of the portion of the active set; (iii) displaying to a user those images of the active set having a confidence score having at least a predetermined threshold together with the associated predicted labels; (iv) receiving validation information from the user relating to the displayed images; (v) moving each image of the active set for which the user agreed with the predicted label to the training set to create an expanded training set; (vi) re-training the initial trained deep learning model using the expanded training set; and applying the retrained deep learning model to the stack of images to perform a stereology analysis and display the results to the user.

BRIEF DESCRIPTION OF THE DRAWINGS

FIGS. 1(a)-1(i) show intermediate results of different steps in segmentation-stereology according to the present invention. FIG. 1(a) shows an original image with manual counts. FIG. 1(b) shows an EDF image used by a segmentation method according to the present invention. FIG. 1(c) shows clumps segmented using the threshold computed from an estimated Gaussian Mixture Model (GMM). FIG. 1D processed EDM image. FIG. 1E shows regional minimas in the processed image. FIG. 1F shows background markers for watershed segmentation. FIG. 1G shows watershed regions reconstructed by regional minimas. FIG. 1H shows a Voronoi diagram produced from foreground regions in each segmented clump. FIG. 1I shows final segmentation after smoothing region boundaries using a Savitzky-Golay filter.

FIG. 2(a) shows extended depth of field (EDF) images (right) created from z-stack of images (left) with a low power objective (40×, na 0.65).

FIG. 2(b) shows extended depth of field (EDF) images (right) created from z-stack of images (left) with a high power objective (100×, na 1.3).

FIGS. 4(a)-4(e) are plots of manual and automated cell counts of different tissue sections.

FIG. 5(a) shows two EDF images with variable brightness.

FIG. 5(b) shows the same two EDF images as FIG. 5(a), after segmentation. Additionally, the Figure shows two EDF images from a histology section showing variable brightness.

FIGS. 6(a)-6(d) shows step-wise results of EDF image processing using an automatic stereology framework according to the present invention. FIG. 6(a) shows nucleus segmentation. FIG. 6(b) shows cell clump segmentation. FIG. 6(c) shows cytoplasm approximation. FIG. 6(d) shows cytoplasm refinement.

FIG. 7 shows Algorithm 1, which is an automatic stereology framework according to the present invention.

FIG. 8 shows a list of equations that can be used in an automated stereology framework according to the present invention.

FIG. 11 shows a schematic of a fine refinement step according to the present invention.

FIG. 12 shows Corpuscle problem.

FIG. 14 shows NeuN immunostained neurons in mouse brain section. Example of low (cortex; upper) and high (CA1; lower) packing density.

FIG. 15 EDF image showing neurons segmented by ASA method.

FIG. 18 shows results for predicted segmentation of EDF images using the CNN.

FIG. 19 shows schematic diagram of the automated stereology of the invention. (FAST™ stands for "Fully Automatic Stereology Technology," a phrase used to describe certain embodiments of the automated stereology of the invention.)

FIGS. 21(*a*)-21(*c*) show an example from the data set, where a) is the manual annotation (counted neurons have dots), b) is the EDF image, and c) is the ASA mask for the EDF image shown in (b).

FIGS. 22(*a*)-22(*c*) show a method according to an embodiment of the subject invention, in three steps: a) pre-processing stacks, creating EDF images, and applying ASA, then human verification; b) active deep learning process using accepted ASA masks/images for training, and ASA masks/images as an active set, along with human verification (i.e., accept or reject) on a subset of predicted masks based on confidence; and c) testing and post-processing on a test set of a separate mouse (mouse id 17).

DETAILED DISCLOSURE OF THE INVENTION

Figure 3:
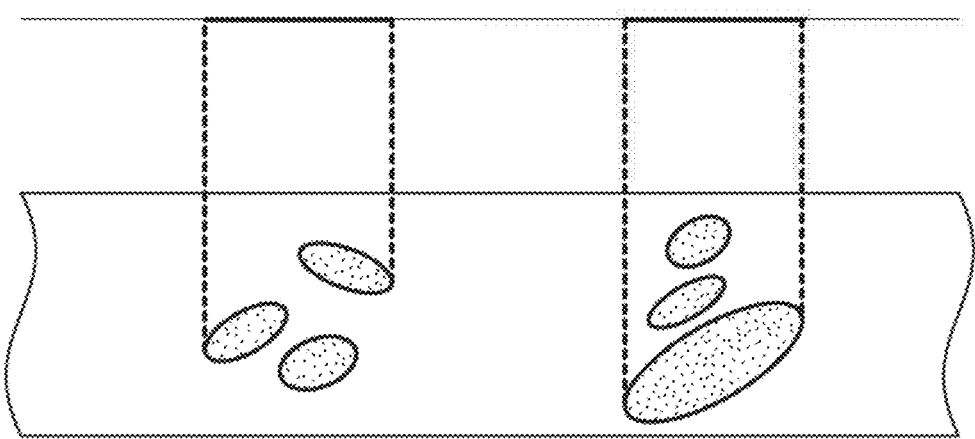
FIG. 3 is a schematic of NeuN-stained soma in a thick section at low power (showing over-projection on left and masking on the right) and also shows a schematic of high signal-to-noise objects in a thick section showing over-projection (left) and masking (right).

Embodiments of the present invention include systems and methods for automated stereology. Embodiments of the present invention include an automatic optical fractionator that can obtain accurate and efficient stereology-based estimates of the number and size of biological objects (cells) in tissue sections. Used in combination with segmentation algorithms and immunostaining methods, automatic estimates of cell number and size (volume) are obtainable from extended depth of field images built from three-dimensional volumes of tissue (disector stacks). Methods of automated stereology utilizing active deep learning are also provided and are discussed in more detail in Example 6.

Embodiments of the present invention include a novel combination of extended depth of field (EDF) images that give 2-D representations of 3-D cells in a disector volume at their optimal plane of focus, and the application of segmentation algorithms to these EDF images in order to automatically make unbiased (accurate) determinations of the true number and size (volume) of cells visualized by staining. A variety of staining methods can be applied, which are known in the art. By increasing the sampling stringency, the automatic estimates of cell number and size will approach their true value. The segmentation method can include a combination of Gaussian Mixture Model (GMM), morphological operations, watershed segmentation, Voronoi diagrams and boundary smoothing, though it is recognized that equivalent segmentation algorithms could achieve a similar result. The application of a segmentation algorithm to EDF images allows for automatic estimates of object number and size in disector volumes that represent a known fraction of a reference space, hence the designation automatic optical fractionator.

Embodiments of the present invention can include a step of nucleus detection and segmentation. FIG. 6 shows a series of processing steps performed on an EDF image.

In nucleus detection and segmentation, the primary goal is to detect and segment nuclei commonly represented by small uniform relatively dark and convex regions. Because each segmented nucleus is an indication of a cell, the result of this step directly affects the outcome of the final cytoplasm segmentation. The three most visually distinctive and important features of nuclei are size, average intensity and solidity, which can be used in iterative algorithms of the present invention to detect and segment nuclei. Due to the cytoplasm segmentation methods of the present invention, minor segmentation inaccuracies in this step will have only negligible effects on the final results. Finally, since nuclear detection inaccuracy has more adverse effects on the final segmentation outcome, algorithms of the present invention can be designed to have high sensitivity to nuclei. The suggested method (or algorithm) for this task is a novel iterative approach for detecting (and segmenting) nuclei, and the method will now be further explained.

An EDF image can first be blurred using a 2-D adaptive noise-removal filter. An algorithm of the present invention can then iteratively binarize the image starting with a low threshold to find seed points from different nuclei. Too small or too concave regions can be removed after each binarization and remaining regions can be added to a nucleus mask. The nucleus mask can keep the nuclei segmented at each execution phase of the algorithm. A region replaces previous regions only if it has greater solidity than all the previous region(s) that overlap with it. This ensures that a newly appearing region does not replace other more convex region(s). The thresholding range can be decided based on the minimum and maximum average intensity of a typical (or average) nucleus in the images. The image can also be iterated in multiple steps (e.g., steps of 10) for faster computation.

Two post-processing steps can also be incorporated. In the two post-processing steps, some or all regions can be dilated and filtered. Those regions having a difference between their outer boundary average intensity and region average intensity that is smaller than a threshold can be removed. It should be noted that most of the artifacts can be ignored because of their size (if they are isolated) or because of their solidity (if they are overlapping). Although the algorithm is simple and fast, it is also very accurate on both synthetic and real image datasets and can outperform other state-of-the-art algorithms.

FIG. 7 shows an example of an algorithm (Algorithm 1) according to the present invention. Filtering regions based on a maximum size can be considered, as seen in line 6 of Algorithm 1. The filter can increase segmentation accuracy but should not change the results for nucleus detection accuracy on previous cytology datasets. The nucleus, represented by region A in ground truth, is considered to be detected by region B in the segmentation results by the rule in Equation 11 of FIG. 8.

According to the present invention, clump segmentation can follow nucleus detection and segmentation. In clump segmentation, the cell clumps (cellular masses that contain urothelial cells) are segmented from the background. Generally, the background in each EDF image is uniformly bright and the pixels of the foreground are darker, but have more variation. This contrast causes the brightness of the darkest background pixel to be intrinsically higher than the brightest foreground pixel, although this is not always the case. Therefore, a simple thresholding and some morphological operations can segment the background from the foreground.

According to an embodiment of the present invention, the algorithm learns a Gaussian Mixture Model (GMM) with two components on the pixel intensities using an Expectation Maximization (EM) algorithm. One Gaussian can estimate the distribution of foreground (cell clumps) pixel intensities and the second can estimate the background pixel intensities. Using the background Gaussian distribution, the threshold $T=Q(q)$, where $Q(\cdot)$ is selected as the quantile function of the normal distribution, which can be defined as in Equation 1 (FIG. 8), where $\mu b$ and $b$ are the mean and standard deviation of the background normal distribution and $erf(\cdot)$ is the error function.

Figure 9:
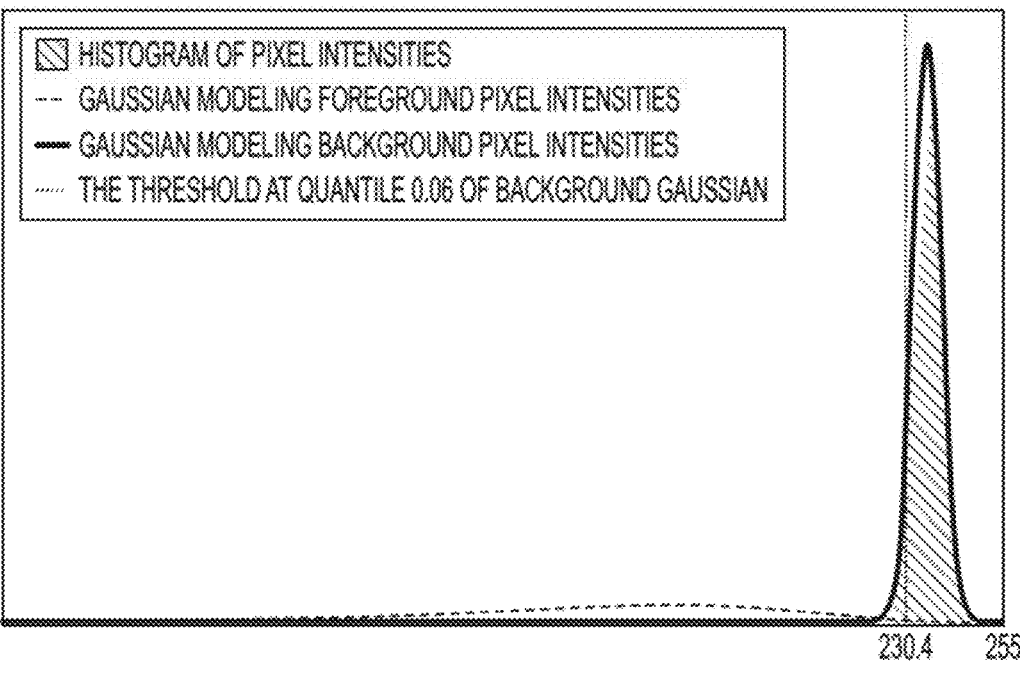
FIG. 9 shows a histogram of pixel intensities of a real EDF image, its corresponding estimated GMM and a selected threshold.

FIG. 9 shows a histogram of pixel intensities of a real EDF image, its corresponding estimated GMM and the selected threshold. After an image is binarized using the threshold T, a connected component analysis can be performed. Those connected components that did not contain any nucleus, or have small areas, or an average intensity greater than $Q(q0)$ can removed. Alternatively, those nuclei that do not overlap with any segmented cell clump can be discarded.

After clump segmentation, cytoplasm segmentation can be performed, which involves segmenting the overlapping cytoplasm. Generally the best focal plane for a specific cell is found when its nucleus is in focus. Therefore, it can be safely assumed that a nucleus is in focus when its cytoplasm is also (at least relatively) in focus, and vice versa. Based on this assumption, a cytoplasm boundary of a nucleus can be approximated by assigning the parts of the image that have focal measurements that are similar to the nucleus and are relatively close. These two criteria (being relatively close to the nucleus and having similar focal measurements to that of the nucleus) are the main criteria with which to approximate the cytoplasm boundaries using the image stack. After approximating the boundary, the boundaries can be refined in two more steps using the EDF image.

To approximate the cytoplasm boundaries, a square grid with width W can be overlaid on each image in the stack. Instead of assigning pixels of the image to different nuclei, the boundaries can be approximated by assigning grid squares (or subimages). This can increase computational speed and also allows for defining a focus measure to estimate the focus of the area enclosed in a grid square. Based on the above assumption, if two subimages that are near in distance come into focus and go out of focus similarly in different images of the image stack, then it is likely they belong to the same cell. This will give an approximation of cytoplasm boundaries.

Considering the (i,j)-th grid square (that is in row i and column j). For image k in the stack, the focus measure of Ik ((i,j)-th grid square in k-th image in the stack), Fk, can be defined as the standard deviation of pixel intensities in the grid square. A focus vector of (i, j)-i,j-th grid square can be defined as the vector containing focus measures of all images in the stack, (F1, F2, . . . , F20) (assuming there are 20 images in each stack in the dataset). The focus vector can then be normalized to have values within the range [0, 1] and be denoted by (F1, F2, . . . , F20).

The focus distance of the (i,j) and (i0,j0)-th grid squares, Si0,j0, can then be defined by the i,j Euclidean distance of their corresponding normalized focus vectors as shown in Equation 2 of FIG. 8. Equation 3 shows the measure of the closeness of (i,j) and (i0,j0)-th grid squares. Finally, the likelihood of the (i,j) and (i0,j0)-th grid squares belonging to the same cell can be estimated by Equation 4.

Using the likelihood measure, L, defined above for two subimages belonging to the same cell, the likelihood of a subimage belonging to the cytoplasm of a particular cell is estimated by considering the fact that its nucleus is part of the cell. Therefore, to find out which subimages are a part of a particular cell, a search is done for subimages that have a high likelihood of belonging to the same cell with the subimages overlapping with the nucleus. Hence, to compute the likelihood of the (i,j)-th subimage belonging to the cytoplasm of a cell with a nucleus that overlaps with (i1, j1), (i2, j2), . . . , (im0, jm0)-th subimages, we set m as the index of the detected nucleus in a cell clump (Equation 5). Lastly, if there are N nuclei detected in a cell clump, namely nucleus 1 through N, the (i,j)-th subimage can be assigned to nucleus m as shown in Equation 6. In other words, a subimage is assigned as the cytoplasm of a cell if the weighted likelihood of it belonging to that cell is greater than the sum of the likelihoods of it belonging to other cells in the clump. The permitted degree of overlap between cells in a clump can be adjusted: higher values allow the cells in a cell clump to overlap more, and vice versa. In the next two processes that are described, the approximated boundaries are refined.

Figure 10:
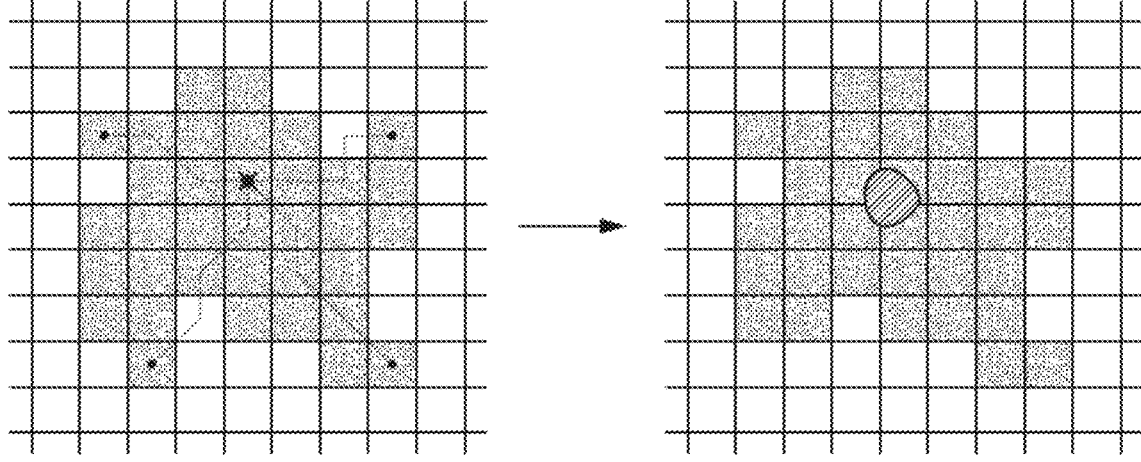
FIG. 10 shows a schematic of a coarse refinement step showing removal of subimages not reachable by a centroid subimage.
Figure 13:
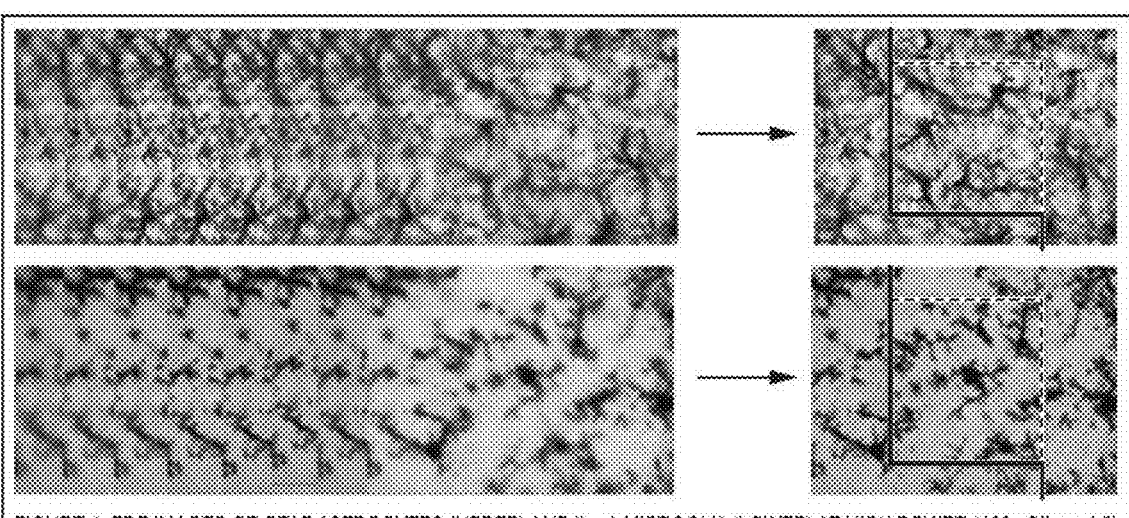
FIG. 13 shows EDF images of GFAP astrocyltes (upper) and the Iba-1 microglia (lower) at high power (100× oil na 1.3).
Figure 16:
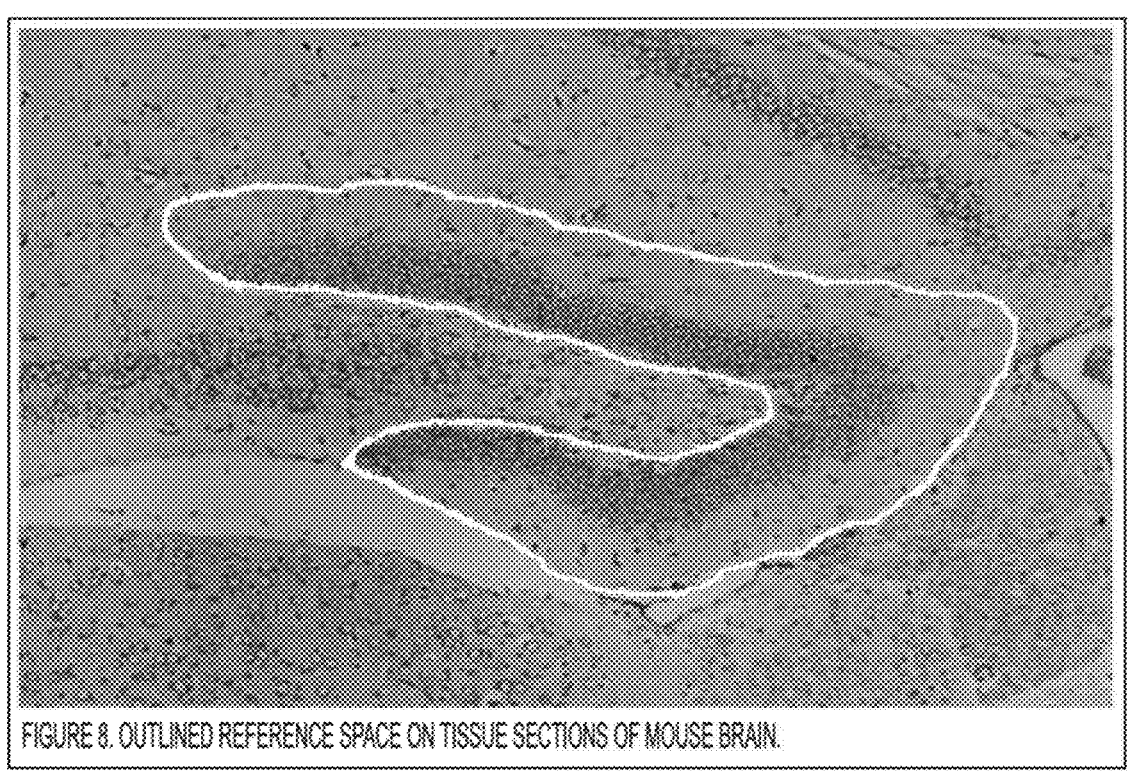
FIG. 16 shows outlined reference space on tissue sections of mouse brain.

The first step of refining the approximated boundaries can include coarse refinement, which is defined as refining the boundary at the subimage level. Unlike nuclei, which are mostly convex, the shape of cytoplasm can show substantial concavity. Therefore, enforcing convexity on cytoplasm boundaries is not realistic, though a limited level of concavity can be allowed in cytoplasm boundaries. To accomplish this, reachability notation can be defined and grid squares that are not reachable from the nucleus centroid can be removed. For example, suppose that the nucleus centroid falls in the (i,j)-th grid square, it can be assumed that the (i0,j0)-th grid square is not reachable from the (i,j)-th grid square if there is at least one grid square on the discretized line segment from (i,j) to (i0,j0) that is not assigned to the cell. Discretization can be implemented using the fast and simple algorithms that are known in the art (and outlined in the References, below). Removing a grid square may make previously reachable grid squares not-reachable. Not-reachable grid squares can continue to be removed as long as such grid squares exist. FIG. 10 shows an example of two removed unreachable grid squares for a cell and its final shape.

The second step of refining the approximated boundaries can include fine refinement, which refines the boundary at the pixel level. Fine refinement at the pixel level can be conducted in an iterative process. The effect of nuclei on the boundary evolution can be removed by replacing each nucleus region's pixel intensity by the mean intensity of its outer boundary. This operation can result in smoothing the segmented nuclei regions significantly and preventing edge pixels caused by nuclei from attracting the boundaries.

Moving from a pixel outside the cell towards the centroid of its nucleus creates a transition from a (relatively) bright to a darker pixel at the time of entering the area of the cell (at the cytoplasm boundary). The first phase of each iteration can find such locations. However, finding the correct locations is often not an easy task because (1) these edge pixels are not always easily detectable because of low contrast and signal to noise ratio; and (2) the presence of artifacts and non-cells create spurious edges. The first issue can be addressed with a filter that smooths the transition locations using the calculated transition locations before and after. This step ensures that if enough edge pixels are detected correctly, a missing/incorrectly detected edge pixel will be recovered. To minimize the adverse effect of spurious edges in the first phase of each iteration, a rougher smoothing filter can be used to smooth those values and others values further from their smoothed values. The filter can be applied again to remaining values and the new estimated values are used to refine the boundary. A weight vector can also be defined to give a higher preference to edge pixels in the vicinity of the refined boundary at the previous iteration, or at approximated boundary from previous coarse refinement step. The details this step will now be discussed.

Suppose that the boundary contains pixels of coordinates $(cx+r\Theta \cos \Theta, cy+r\Theta \sin \Theta)$, for $\Theta=0, 1, \ldots, 359$, where $(cx, cy)$ are the coordinates of the nucleus centroid. In the first iteration, for each $\Theta \in \{0, 1, \ldots, 359\}$, a weight vector is defined (Equation 7) that contains the values of the composite of a sigmoid function with the normalized distance of points on the radial from the boundary point. A pixel corresponded to radius (and stride s, $p^s \Theta$ has the coordinates $(c_X+s \cos \Theta, cy+s \cos \Theta)$. The gradient at $p^s\Theta$, $G(p^s\Theta)$, is defined as shown (Equation 8) where $I(p)$ is the intensity of pixel p. For strides larger than $2r\Theta$ and for strides smaller than 0, the intensity is respectively set to a maximum or minimum. For each $\Theta \in \{0, 1, \ldots, 359\}$, $p'^\Theta$ is selected as the edge pixel (Equation 9).

After choosing the sequence of points on the boundary, the x-coordinates can be smoothed. To filter out the spurious edge pixels after the first smoothing, those pixels that have a distance greater than a threshold from their smoothed estimation can be discarded. The filter can be applied again to the remaining points and the new smoothed boundary can replace the previous estimated boundary. This can minimize the effect of the spurious or inaccurately selected pixels on the boundary evolution.

FIG. 11 shows how newly selected boundary points and smoothing affect the previous boundary of a cell in a synthetic image. The only difference between the first iteration and the following iterations is that in the following iterations the strides in Equation 7 are only considered from 0 through $r\Theta$. Therefore, in the first iteration the area may grow, but after that it only can shrink. Inflation in iterations other than the first iteration can be restricted because, if there are no strong edge pixels due to poor contrast, the boundaries usually expand until they reach to the cell clump boundary.

The iterations can continue until the ratio of the size of non-overlapping area (between the new and previous areas) to the size of previous area is negligible (e.g., less than 0.01). Except for a few parameters, e.g., minimum and maximum sizes for nuclei and cytoplasm, most of the parameters in the segmentation algorithm are set in an automatic and adaptive manner separately for each image, making the results of the automatic framework consistent with variations in image acquisition. An important factor that favors the accurate detection and segmentation of cells in each image stack is that the segmentation algorithm has been specifically designed to be resistant to low contrast. As part of the procedures for optimizing the present invention, a consistent mid-level of illumination can be determined. Because images collected in datasets will have varying brightness, intensity thresholds can be set adaptively by the estimated GMM for each image, allowing the algorithm to generate consistent segmentations for different cell types, staining intensities and microscope settings that cause brightness variation at the image and neuron levels under brightfield illumination, as seen in FIG. 5.

Embodiments of the subject invention provide an automation platform for scientists, such as neuroscientists, to complete unbiased stereology studies with greater accuracy, precision, speed, and lower costs. In some embodiments, the automatic stereology of the invention can use machine learning, including deep learning from a convolutional neural network (CNN) and adaptive segmentation algorithms (ASA) to segment stained cells from EDF images created from 3-D disector volumes. In other embodiments, the automatic stereology of the invention uses a deep belief network (DBN), including a forward propagating network comprising an input layer, a plurality of hidden layers, and an output layer. When used in neurological applications, embodiments of the subject invention provide that the entire process from outlining a region of interest to providing results can take less than 30 minutes per brain. Compared to subjective counting with manual stereology, studies with the automatic stereology of the invention show greater accuracy and negligible variation from non-biological sources.

The CNN can include a convolutional layer, a Rectified Linear Unit (ReLU) layer, a pooling layer, and a fully connected (FC) layer. The convolution layer can comprises a plurality of filters configured to detect features of an input image. Each filter can share the same biases and weights, and analyze the same number of input neurons. The filter can convolve across the dimensions of the input image and compute a dot product of the filter and the image subset in order to generate a matrix or feature map. The convolution process can preserve the spatial relationship between the pixels. This process can be repeated for each filter in the convolution layer. In order to account for real world non-linearity, a Rectified Linear Unit (ReLU) operation can apply an activation function to the matrix to introduce a non-linear element to the matrix or image, as convolution is a linear operation. In order to reduce the number of parameters and computation in the CNN, a pooling layer can be inserted after the ReLU operation to reduce the dimensions of each matrix or feature map. The output matrix or image of the pooling layer can then be treated as an input image of a convolution layer. The above described basic steps of the CNN can be repeated to extract the desired output. The output of the final pooling layer can be an input for a Fully Connected (FC) Layer. The CNN can learn to count cells through the different methods including backpropagation, in which known images with known cell or target object counts are processed through the CNN and the accuracy or the error of the output can be recorded. If the cell number count provided by the CNN exhibits poor accuracy or high error, parameters can be adjusted to increase the accuracy of the CNN.

In some specific neurological applications, the invention provides automatic counts of immunostained neurons and glial cells in neocortex and CA1 of brains, such as mice and human brains. By removing manual stereology as the major obstacle to progress for many basic neuroscience and pre-clinical research studies, the automated stereology of the invention provides of novel strategies for therapeutic management of neurological diseases and mental illnesses.

In a semi-automatic mode of the invention, automatic stereology can provide a confirmation step following segmentation by an ASA and prior to deep learning by the CNN. The system can be additionally configured to permit a system user to manually count cells and override a processor generated determination of the cell count.

Previous applications of automatic image analysis of neural elements have focused on 2-D images on thin tissue sections. Conceptually, this approach is semi-quantitative because it cannot make accurate (unbiased) estimates of cell number due to sampling bias from the Corpuscle Problem (FIG. 12). The number of 2-D profiles (right) on a cut surface that appear by a knife passing through 3-D objects (left) is not equal to the true number of objects (left) because of bias related to the cell size, shape and orientation. According to the disector principle, unbiased stereology overcomes this bias by quantifying 3-D cells within a known volume. Similarly, the FAST approach overcomes this bias using EDF images. The EDF algorithm captures each cell in disector volumes at its maximum plane of resolution and then projects each cell onto an artificial 2-D plane (see, for example, FIG. 2(b)), EDF images of NeuN immunostained neurons). As a result, the cell number on the EDF image equals the true number of cells in the disector volume. The use of unbiased counting rules (exclusion planes) avoids bias due to edge effects. Combining ASA for segmenting NeuN-stained neurons is a first-in-class use of EDF images for unbiased stereology.

Certain embodiments of the invention provide application of a CNN to segment immunostained neurons, astrocytes, and microglia cells on high resolution EDF images for unbiased stereology of cell number. To reduce time and effort for generating ground truth for training the model, ASA is applied to train the model. For this approach the annotations are created by preprocessing images of immunostained cells on EDF images, learning a Gaussian Mixture Model on each individual image, thresholding and post-processing the images. An end user can manually edit the segmented image to create a sophisticated training dataset for training the neural network. Importantly, this confirmation step in the creation of the training dataset will also address customer needs to interact with the data collection process, as opposed to accepting fully automatic results.

The number of cells within each disector can be determined and used for calculation of total cell number using the unbiased optical fractionator method. According to this approach for scaling from local (disector) to region (cortex, CA1) levels, as sampling increases the estimate of neuron number progressively converges on the true value. Once the sampling error is sufficiently low, e.g., coefficient of error (CE) less than 10% (CE<0.10), the estimate will be considered stable. To achieve optimal estimates, sampling stringencies for cells and disectors can be determined within each region. As such, the invention provides employing a combination of ASA/CNN to segment neural elements for stereology analysis.

Certain embodiments of the invention provide an effective segmentation method for different neural elements stained with different colorimetric protocols and in brain regions with different packing densities. To overcome this barrier, CNN can be used (Unet) to segment neurons that are immunostained with high signal: noise (S:N) immunomarkers, e.g., NeuN for neurons, and then tune this CNN to segment microglia and astrocytes stained with similarly high S:N immunostains (Iba-1 and GFAP, respectively).

In other embodiments separate ASAs are developed and optimized for each neural element (neurons and glial cells) immunostained with defined staining protocols. Both approaches allow for a range of pre- and post-processing steps, leading to increased confidence that the technical risks can be overcome using CNN, ASAs, or a combination of the two.

Figure 20:
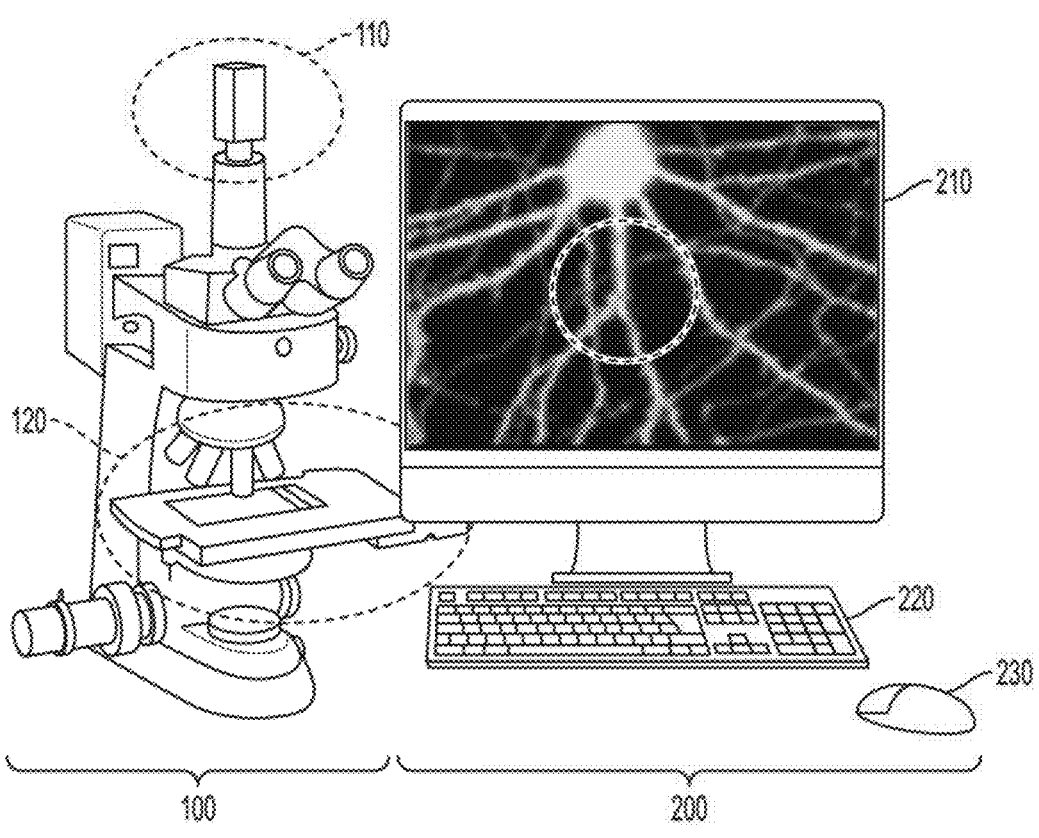
FIG. 20 shows an image of a stereologer system according to an embodiment of the subject invention.

FIG. 20 shows an example stereologer system that may be used to implement features described above with reference to FIGS. 1-19. The stereology system includes a microscope 100, a digital camera 110, a motorized stage 120, x, y, and z axis motors, a dual stage micrometer, a digital imaging system, a processor, a memory device, a communication interface connecting the microscope and a computer readable medium, a computer 200, a high definition monitor 210, a keyboard 220, and a mouse 230.

The communication interface connecting the microscope and the computer readable medium can be, for example, a communications port, a wired transceiver, a wireless transceiver, and/or a network card. The communication interface can be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

Embodiments of the stereologer system of FIG. 20 may be configured to perform any feature or any combination of features described herein. In certain embodiments, the computer readable medium may store instructions which, when executed by the processor, cause the processor to perform any feature or any combination of features described above.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

Although FIG. 20 shows that the stereology systems includes a single microscope 100, a single digital camera 110, a single motorized stage 120, a single computer, 200, a single display 110. A single keyboard 120, and a single mouse 230, the stereologer system may include multiples of each or any combination of these components, and may be configured to perform, analogous functionality to that described herein.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A method for performing computerized stereology, comprising:

i) capturing, by an imager, a data set comprising a stack of images of a three-dimensional (3D) object, the stack of images being a sequence of images of the 3D object captured in increments having a step size along an axis of the 3D object;

ii) performing, by a processor, pre-processing on the data set to convert each image of the stack of images to gray and applying at least one algorithm to the data set to create a single image of the stack and to segment the single image into segments and provide respective labels for the segments;

iii) performing, by the processor, a training of a deep learning model using a deep neural network to generate a snapshot ensemble comprising a plurality of snapshot models saved periodically during the training, wherein the training of the deep learning model results in a trained deep learning model; iv) applying, by the processor, the snapshot ensemble to predict an active set and compute a confidence score for each label of the respective labels for the segments, wherein each label with a confidence score that exceeds a predetermined threshold is moved to the active set;

v) reviewing, by a user, all labels in the active set to verify whether the label displays sufficient agreement with an expected value, wherein labels verified by the user t display sufficient agreement are moved to a train set and labels rejected by the user as not displaying sufficient agreement remain in the active set; and vi) performing, by the processor, a testing process on the train set using the trained deep learning model.

Embodiment 2. The method according to embodiment 1, wherein the at least one algorithm applied to the data set comprises an adaptive segmentation algorithm (ASA).

Embodiment 3. The method according to any of embodiments 1-2, wherein the at least one algorithm applied to the data set comprises an extended depth of field (EDF) algorithm.

Embodiment 4. The method according to any of embodiments 1-3, wherein the single image of the stack is an EDF image.

Embodiment 5. The method according to any of embodiments 1-4, wherein the labels are segmentation masks.

Embodiment 6. The method according to any of embodiments 1-5, wherein th snapshot ensemble comprises the plurality of snapshot models saved every five epochs during the training.

Embodiment 7. The method according to any of embodiments 1-6, wherein the predetermined threshold is 0:9.

Embodiment 8. The method according to any of embodiments 1-7, wherein steps iii), iv), and v) are repeated a plurality of times before step vi) is performed.

Embodiment 9. The method according to any of embodiments 1-8, wherein steps iii), iv), and v) are repeated at least five times before step vi) is performed.

Embodiment 10. The method according to any of embodiments 1-9, wherein the deep learning model comprises a convolutional neural network (CNN).

Embodiment 11. The method according to any of embodiments 1-10, further comprising:

vii) performing, by the processor, a post-processing step on the train set to remove noise, apply unbiased stereology rules, and apply a watershed algorithm.

Embodiment 12. A system for performing computerized stereology, the system comprising:

an imager configured to capture a stack of images of a three-dimensional (3D) object, the stack of images being a sequence of images of the 3D object, and the imager being configured to capture the sequence of images of the 3D object in increments having a step size along an axis of the 3D object;

a processor in operable communication with the imager; and a computer-readable medium in operable communication with the processor and having instructions stored thereon that, when executed, cause the processor to perform the following steps:

i) perform pre-processing on the data set to convert each image of the stack of images to gray and applying at least one algorithm to the data set to create a single image of the stack and to segment the single image into segments and provide respective labels for the segments;

ii) perform a training of a deep learning model using a deep neural network to generate a snapshot ensemble comprising a plurality of snapshot models saved periodically during the training, wherein the training of the deep learning model results in a trained deep learning model;

iii) apply the snapshot ensemble to predict an active set and compute a confidence score for each label of the respective labels for the segments, wherein each label with a confidence score that exceeds a predetermined threshold is moved to the active set;

iv) allow a user to review all labels in the active set to verify whether the label displays sufficient agreement with an expected value, wherein labels verified by the user to display sufficient agreement are moved to a train set and labels rejected by the user as not displaying sufficient agreement remain in the active set; and v) perform a testing process on the train set using the trained deep learning model.

Embodiment 13. The system according to embodiment 12, wherein the at least one algorithm applied to the data set comprises an adaptive segmentation algorithm (ASA).

Embodiment 14. The system according to any of embodiments 12-13, wherein the at least one algorithm applied to the data set comprises an extended depth of field (EDF) algorithm.

Embodiment 15. The system according to any of embodiments 12-14, wherein the single image of the stack is an EDF image.

Embodiment 16. The system according to any of embodiments 12-15, wherein the labels are segmentation masks.

Embodiment 17. The system according to any of embodiments 12-16, wherein the predetermined threshold is 0:9.

Embodiment 18. The system according to any of embodiments 12-17, wherein steps ii), iii), and iv) are repeated a plurality of times before step v) is performed.

Embodiment 19. The system according to any of embodiments 12-18, wherein steps ii), iii), and iv) are repeated at least five times before step v) is performed.

Embodiment 20. The system according to any of embodiments 12-19, wherein the deep learning model comprises a convolutional neural network (CNN).

Embodiment 21. The system according to any of embodiments 12-20, wherein the instructions, when executed, further cause the processor to perform the following step:

vi) perform a post-processing step on the train set to remove noise, apply unbiased stereology rules, and apply a watershed algorithm.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

The performance of a segmentation algorithm can be evaluated after the segmentation ground truth is collected. Results from ASM and ground truth were correlated along with other analytic metrics (see, for example, Table 1, below). One of the popular measures to evaluate the segmentation performance is the Dice Similarity Coefficient (DSC). For two regions, A and B, DSC(A,B) is defined as:

$$\frac{2|A \cap B|}{|A| + |B|},$$

where $|\bullet|$ is the area of the region. The Dice Similarity Coefficient (DSC) of two regions A and B is defined as shown in Equation 10 of FIG. 8. Other evaluation metrics include False Negative Rate at object level (FNRo), True Positive Rate at pixel level (TPRp) and False Positive Rate at pixel level (FPRp). A segmented cell in the ground truth is considered missed if there is no region in the segmentation result that has a DSC greater than 0.7. FNRo is the rate of cells missed in the ground truth and TPRp and FPRp are the average of true positive and false positive rates, respectively, at pixel levels of those regions that are not missed.

From the viewpoint of algorithm segmentation, following adjustments to maxima and minima settings, the morphological characteristics of different cells are quite similar. It is expected that the automatic stereology framework will miss less than 5% of cells on average when the pairwise cell overlapping degree is not higher than 0.3. Prior to optimization, the algorithm is expected to detect nuclei with precision greater than 0.95 and recall greater than 0.90, and miss around 20% of cells in EDF images for a Dice Similarity Coefficient less than 0.7. The 20% miss rate is around half of the average miss rate reported for subjective assessments using conventional methods for manual stereology.

Example 2

All procedures for animal handling and use were approved by the USF Institutional Animal Care and Use Committee and followed NIH guidelines for the care and use of laboratory animals. Two Tg4510 male mice aged 6-8 months and two age- and sex-matched non-tg littermate controls were selected at random from the colony at the Byrd Alzheimer's Institute at the University of South Florida in Tampa, FL. To validate the ASF for counting Neu-N immunostained neurons, the well-characterized Tg4510 line was chosen with responder and activator transgenes that drive expression of a P301L tau mutation under control of a tetracycline operon-responsive element. Rather than testing for a specific hypotheses related to tauopathies, neurodegeneration or neuroinflammation, this line of tg mice was selected because the brains show a wide range of neocortical cell morphologies under high power brightfield illumination, including normal and damaged neurons and resting/activated states of neuroglia cells.

Mice were deeply anesthetized on an isothermal pad and perfused with 25 ml of cold sterile buffered saline. Brains were removed and one hemisphere immersion fixed for 24 hours in freshly prepared phosphate buffered paraformaldehyde. After fixation, brains were transferred to Dulbecco's phosphate buffered saline and stored at 4° C. Prior to sectioning, brains were cryoprotected in 10, 20 and 30% sucrose. Frozen 50-μm sections were collected with a sliding microtome, transferred to 24 well plates in Dulbecco's phosphate buffered saline and stored at 4° C. One set of every $n^{th}$ section was sampled in a systematic-random to obtain 6-8 sections through each neocortex.

Sampled sections were immunostained with Neu-N antibodies for high S:N visualization of neurons. Sections from all animals were placed in a multi-sample staining tray and endogenous peroxidase was blocked (10% methanol, 3% $H_2O_2$ in PBS; 30 min). Tissue samples were permeabilized (with 0.2% lysine, 1% Triton X-100 in PBS solution) and incubated overnight in an appropriate primary antibody. Anti-NeuN (Millipore, Darmstadt, Germany) antibodies were used in this experiment. Sections were washed in PBS, and then incubated in corresponding biotinylated secondary antibody (Vector Laboratories, Burlingame, CA). The tissue was again washed after 2 h and incubated with Vectastain® Elite® ABC kit (Vector Laboratories) for enzyme conjugation. Finally, sections were stained using 0.05% diaminobenzidine and 0.03% $H_2O_2$. Tissue sections were mounted onto slides, dehydrated, and cover slipped.

An algorithmic variation was developed and optimized from an ensemble of segmentations algorithms and Seed Detection-Region Growing approaches. The purpose of the developed algorithm was to automatically segment high S:N neurons on EDF images. The numbers of neurons within disector volumes was used to calculate total neuron number in a reference volume using the unbiased optical fractionator method [Equation 1].

Since the regions of interest (neuronal cell bodies) have arbitrary sizes, shapes, and orientations, none of these features can be assumed a priori for either the segmentation step or quantification using unbiased stereology. The segmentation method applied was a combination of Gaussian Mixture Model (GMM), morphological operations, watershed segmentation, Voronoi diagrams and boundary smoothing, as detailed above. FIG. 1 shows the visual results of successive steps in the segmentation of an EDF image. Black regions are removed due to not overlapping with cells of interest, red regions are excluded due to overlapping with exclusion lines, and blue regions are neuron targets for automated counting. Green marks are manual marks inside blue regions, yellow marks are automated marks not counted manually, and red marks are missed manual marks. FIG. 1*a* shows a microscopy image with an unbiased disector frame used for manual counts. FIG. 1*b* is an EDF image constructed from the z-stack of images (disector stack) used for neuron segmentation. The final segmentation result is illustrated in FIG. 1I, where inclusion (green) and exclusion (red) lines shown in the original image are used by a manual optical disector and the automatic framework for counting neurons independent of their geometric properties (size, shape, and orientation).

Clumps of regions (Neu-N neuronal cell bodies) in the image were segmented by a Gaussian Mixture Model (GMM) with two components estimated based on pixel intensities using an Expectation Maximization (EM) algorithm. The image was binarized using a threshold computed by a background Gaussian quantile function value and morphological operations followed to extract the separate clumped neuron regions (FIG. 1c).

The image was preprocessed by morphological operations with opening by reconstruction followed by closing by reconstruction. These operations smooth the image and remove very small dark or bright regions (FIG. 1D) while connecting very close regions and removing very small region minimas.

After preprocessing, the image foreground and background markers were extracted for watershed segmentation. The foreground and background markers are region minimas extracted from the preprocessed image (FIG. 1E) and boundaries between regions of a watershed segmentation (FIG. 1F), respectively. Region minimas select for neurons and remove regions that do not fall into previously segmented neuron clumps.

The watershed segmentation was applied using the foreground and background markers previously described. One of the regions corresponded to the background and the others were foreground regions. Foreground regions that overlap with the map of segmented clumps were kept and the others discarded (FIG. 1g). This watershed segmentation usually expands original regional minimas and gives a better approximation of neuron boundaries. Lastly, each of the clump regions were split using the Voronoi diagrams obtained by the watershed regions within (FIG. 1h).

In the final step, the region boundaries were refined using Savitzky-Golay filter. This filter results in smoother boundaries and produces less concave regions. It was observed that a region containing a single neuron may be split into two or more subregions if more than one regional minima were detected. To diminish the adverse effect of such splits, a region was not split if its size was less than a maximum threshold and the solidity of the region obtained by the refined boundary of original region was larger than the average solidity of all regions obtained by the refined boundaries of subregions. For the final neuron count, segmented regions were removed that 1) do not overlap with the region of interest; or 2) overlap the exclusion lines of the disector frame. The number of remaining regions were chosen as the number of neurons that should be counted. This number summed across all sections [$\Sigma Q^-$] was used to estimate the total number of Neu-N immunopositive neurons [Total $N_{NeuN}$] by an optical fractionator formula:

$$\text{Total } N_{NeuN} = [\Sigma Q^-] \cdot F1 \cdot F2 \cdot F3$$

where F1 is the reciprocal of the section sampling fraction (ssf); F2 is the reciprocal of the area sampling fraction (asf); and F3 is the reciprocal of the thickness sampling fraction (tsf).

Example 3

An empirical study was carried out to determine optimal image magnification. Neu-N neurons were counted using manual stereology (ground truth) and the automatic framework on images collected at high power [100× Plan Fluorite, n.a. 1.3] and low power (40× Plan Acromat, n.a. 0.65) by the following procedure. At high power, a trained technician counted Neu-N neurons using the manual optical disector (ground truth) with assistance from the Stereologer system [Stereology Resource Center (SRC), Tampa, FL]. At the first random x-y location on the first section, Neu-N neurons were counted by thin focal-plane optical scanning through a 10-μm high disector. Before moving to the next disector location, a stack of ten images about 1 μm apart in the z-axis (so-called disector stacks) were captured and saved for analysis using the automatic framework. This process of manual optical disector counting and saving disector stacks was repeated at 200 to 300 systematic-random x-y locations across 7 systematically sampled sections through neocortex.

On completion, images in each disector stack were merged into a single synthetic Extended Depth of Field (EDF) image. Disector stacks combined into a single EDF image show all Neu-N neurons in focus, allowing the segmentation algorithm to be applied to a single high power image (see, for example, FIG. 2 (lower)). The above process was repeated at low power (40×), and a second set of disector stacks collected and EDF images created (see, for example, FIG. 1 (upper))]. In the analysis step, ground truth and algorithm counts for NeuN neurons were correlated for the purpose of assessing whether cells magnified by low or high power lens give superior results for the automatic framework. The lower right panel shows disector frame and outlines of NeuN neurons automatically counted by thin focal plane scanning and optical fractionator method.

There was a slightly better correlation ($R^2$=0.95, FIG. 2 upper) at low power (40×) between Neu-N neuron counts for ground truth and the automatic framework in the same disector volumes. The higher correlation for the low power images, however, does not reflect true (accurate) numbers of NeuN neurons in each disector volume due to over-projection and masking. As shown in FIG. 2, over-projection causes cells that overlap in the z-axis to be difficult to resolve as more than one cell. Also, larger cells in the z-axis can mask the presence of smaller ones, resulting in multiple cells that cannot be resolved as more than one. Both of these imaging artifacts arise from image capture using the high depth of field 40×40 lens. This view is supported by the fact that fewer neurons were counted by the low power lens (data not shown). In contrast, the results for Neu-N neuron counts using ground truth and the automatic framework on disector volumes captured at high power showed a slightly lower correlation [($R^2$=0.90, FIG. 2 (lower)]. Over-projection and masking artifacts in these disector volumes could be practically fixed by applying a modified segmentation algorithm with advanced post-processing steps, e.g., a classifier to indicate likely split or overlapping neurons. For images captured at low power, the same classifier approach could not resolve the correct number of neurons due to the high depth of field of the low power lens. Another argument in favor of high power is that the optical fractionator method requires section thickness measurements which are determined manually and automatically by thin focal plane scanning through the z-axis to find the upper and lower optical planes of each section. The high depth of field (thick focal plane) of the low power lens again prevents precise localization of these optical planes. In contrast, the thin focal plane of the high power lens, which has twice the resolving power of the lower power lens, allows for precise localization of the upper and lower section surfaces. To ensure counts are accurate, therefore, both ground truth and ASF counts require high power magnification with a thin focal plane (low depth of field) objective lens.

Ground truth and automatic counts of Neu-N neurons were assessed in the same disector volumes using the following procedure. Six to 8 systematically sampled sections were prepared from each of two (2) Tg4510 mice (Tg-3, Tg-21) and two (2) non-tg controls (Ntg-2, Ntg-9). Two technicians with equivalent training and experience collected ground truth datasets using the manual optical disector (Gundersen et al., 1988 a,b). Sampling was carried out at sufficient x-y locations to achieve high sampling stringency (CE<0.05). As detailed above, after manual optical disector counting, disector stacks were collected in the z-axis for neuron counts by the automatic framework.

counts by two data collectors (C1 and C2). The residual errors in these correlations arise from both approaches. FIG. 4 shows plots for the manual and automated counts for each of the 5 comparisons in Table 2. Results for counts of Neu-N immunostained neurons in neocortex of Tg4510 mice and non-tg controls are shown in Table 2. Comparison of mean Neu-N neuron counts by ground truth and the automatic framework showed a 7% difference for the non-tg mice and a 4% difference for Tg4510 mice. For the ground truth dataset, there was a 24% difference in neuron number (p<0.11, ns). This difference was slightly higher (27%) using the automatic framework, which did reach statistical significance (p<0.04).

TABLE 2

Comparison of ground truth (manual optical disector) and the automatic stereology framework (ASF) for total number (+/−SEM) of Neu-N neurons in neocortex of Tg4510 mice an non-Tg controls.

| Group | N | Ground Truth | | ASF | | % |
| | | Mean Neu-N | $SEM_{NeuN}$ | Mean Neu-N | $SEM_{NeuN}$ | $diff_{NeuN}$ |
| --- | --- | --- | --- | --- | --- | --- |
| Non-Tg (n = 2) | 2 | 1.30E+06 | 1.18E+5 | 1.39E+06 | 7.71E+04 | +7 |
| Tg4510 (n = 2) | 2 | 9.81E+05 | 2.76E+3 | 1.02E+05 | 1.41E+04 | +4 |
| % $diff_{NeuN}$ | | −24 | | −27 | | |

The counts of Neu-N neurons for disector stacks analyzed by ground truth and the automated framework were summed to give the neuron counts across 6 to 8 sections for each case (FIG. 4). Correlations between the automatic framework and ground truth were assessed by the coefficient of determination ($R^2$). Analysis of variation for total number of neocortical Neu-N neurons in the Tg4510 mice and non-tg controls was done by a two-tailed T-test with genotype as the independent variable and statistical significance at p<0.05.

Table 1 presents the ground truth and automated counts and correlations for the sum of all 85 sections analyzed for 4 different cases. The average value for two data collectors was used for mouse 02 values.

TABLE 1

Neu-N neurons counts by ground truth vs. automatic stereology in the same disectors of different 4 mice*. $R^2$ = correlation for manual and automatic counts.

| Collector (C) | Mouse ID | Ground Truth | Auto. Count | $R^2$ |
| --- | --- | --- | --- | --- |
| C1, C2* | 02 | 1249 | 1238 | ≥0.98 |
| C2 | 21 | 858 | 878 | ≥0.98 |
| C1 | 03 | 570 | 603 | ≥0.98 |
| C1 | 09 | 558 | 697 | ≥0.98 |

*average counts between two collectors (C1 and C2) for the same brain.

Correlations for ground truth and the automated framework are shown in Table 2. The correlations show uniformly close relationships between Neu-N neuron counts by both approaches ($R^2$>0.98). Inter-rater reliability for ground truth was assessed by two technicians analyzing different systematic-random disector locations on the same sections through brain 02 (R2=0.95; data not shown). The average value of both data collectors for this brain were used for comparison with results from the automatic framework.

FIGS. 4(a)-(e) are plots of manual and automated cell counts of different tissue sections. These plots of NeuN neuron counts by section show relative agreement between the objective automated framework and subjective manual Since brightness varies at the image and neuron levels under brightfield illumination, intensity thresholds used for the segmentation step must be set adaptively. The GMM component of the algorithm is estimated by pixel intensities of each image separately. As shown in FIG. 5, the whole framework is resistant to brightness variation.

This validation study showed a high correlation ($R^2$>0.98) between the ASF and ground truth for Neu-N counts. With regard to throughput efficiency, the ASF required about 30 minutes to achieve a high level of sampling stringency (CE=0.05). In contrast, two moderately experienced technicians both required about 8 times longer (about 4 hours) using manual stereology to estimate Neu-N number to a comparable sampling stringency on the same sections. With regard to reproducibility, a single inter-rater comparison showed a difference of about 0.05 (95% agreement) for two technicians to analyze different samples of disectors in a single brain. In contrast, intra- and inter-variability for the ASF by the same and different operators is negligible. Except for a few parameters such as minimum and maximum sizes for neuron regions, most of the parameters in the framework are set in an automatic and adaptive manner separately for each image, making the results of the framework consistent with variations in image acquisition. Because images collected in the dataset had varying brightness (FIG. 5), intensity thresholds were set adaptively by the estimated GMM for each image, allowing the ASF to produce consistent segmentations for different cell types, staining intensities and microscope settings. Despite the low statistical power in this study, both the ground truth and ASF showed evidence of cortical neuron loss in brains of Tg4510 mice at 6-8 months of age as previously reported.

In this validation study, cell counts using the automatic framework strongly correlates with counts in exactly the same disector volumes using the manual optical disector. Furthermore, this approach allows for examination of the basis for discrepancies between the ASF and "ground truth." On sections with the lower ground truth counts, e.g., sections 1-7 in FIG. 4 (c), the vast majority of mismatches occur when the data collector fails to resolve overlapping neurons. The ASF according to the present invention handles this situation better by applying the segmentation algorithm to split each cell at its optimal plane of focus in 3-D.

The EDF image shows each cell at its maximal plane of focus in the disector volume. Segmentation of these profiles is required to count those inside the disector frame and not overlapping with exclusion planes. In addition to this purpose, segmented cell profiles are useful for estimating the size distribution using unbiased local size estimators, as has been previously reported. The incorporation of cell size into the results further improves the framework's throughput efficiency vis-à-vis ground truth since estimating cell size requires negligible time and effort compared to cell number alone. By contrast, estimation of cell number and size requires twice the time and effort for the manual stereology workflow compared to cell number alone.

The high correlation of Neu-N counts by manual and automatic approaches (Table 1) shows the framework can be practically used to automate the time- and labor-intensive task of cell counting by unbiased stereology. The total processing time for the automatic approach was between 25 and 30 minutes for counting immunostained cells in a single reference space. This time includes low-power outlining of the reference area and automatic capture of disector stacks on each section (~18 to 20 minutes), and a computation time of about 6 to 8 minutes to create EDF images and run the algorithm. It is expected that analyzing images in RAM will decrease the analysis time per case to about 20 minutes or less.

Example 4

This example combines existing hardware for computerized stereology with software driven by deep learning from a CNN. The CNN automatically segments immunostained neurons, astrocytes and microglial cells on images of 3-D tissue volumes (disector stacks; for EDFs, see FIG. 2(b) for neurons, FIG. 15 for astrocytes and microglia) and make unbiased estimates of total cell numbers using the automatic optical fractionator method.

The optical fractionator method can provide an unbiased stereology estimate of cell number provided the cells can be effectively segmented. Separate adaptive ASAs can be used to segment each cell type or deep transfer learning can be used to train a CNN to segment cells. The ASA approach can require adjusting parameters and other customization steps (pre- and post-processing) to accurately segment cells with variable morphologies, staining characteristics, and cell densities (FIG. 14). Alternatively, training one or more CNNs can require many person-hours of manual annotation of EDF images to collect ground truth. Since deep learning requires good but not extreme accuracy of input images for ground truth the results from the automatic ASA can be used to automatically train the model. Moreover, a further step is implemented to enhance the training set and address customer concerns about accepting fully automatic data; i.e., automatic stereology results without end user verification.

In one embodiment, a semi-automatic mode of the automated stereology is provided. In certain such embodiments, after EDF images are segmented by the ASA, but before training the model, the counts (clicks) on the segmented cells will be displayed to an end user for confirmation (see, for example, FIG. 17). At this point the end user can accept the automatically generated count or modify the count by adding counts based on false negatives and/or removing counts from false positives. This step can reduce the effort for annotating ground truth and require minimal effort from the end user (see, for example, FIG. 17). Compared to manual stereology counting the work is simple, non-tedious and straightforward. End users can view and edit counts from the ASA. Typically, the time to annotate ground truth for deep learning for each cell type per brain will be far less than the 4-5 hours of difficult cell counting for manual stereology. Also, the efforts involved in annotating ground truth for deep learning for each cell type per brain can be less than training the model by manually annotating ground truth. Once the deep learning model is trained from these annotated images, analysis of EDF image sets from the test cases will take about 10 minutes for the motorized microscope stage to automatically capture disector stacks and a few seconds for segmentation and stereology. The results will be a trained model from expert-validated ground truth for analysis of subsequent test cases in 15 minute or less. As such, this Example of the invention provides a novel technology for automatic stereology of histological sections with deep learning, and optionally, an expert input. For optimal brain related applications, the total numbers of three important cells (neurons, astrocytes, microglia) in brains, for example, mouse brains, can be quantified on counterstained tissue sections from regions with a wide range of packing densities (cortex, CA1; FIG. 14). To this end, deep learning with a CNN model trained by expert-validated ground truth can be generated by the ASA method. This approach provides sufficient cell segmentation to overcome the technical barriers and achieves performance metrics.

The accuracy, precision, and efficiency of quantifying neural elements, e.g., cells in stained tissue sections depend on how the analysis is done. A 2-D sampling probe (for example a knife blade) arbitrarily samples cells with an unknown and unknowable probability related to the cell's size, shape, and orientation. Unbiased stereology can provide the theoretical basis for avoiding this and other sampling and estimation biases. However, the current technology with manual stereology is prohibitively time-consuming and laborious for a large and growing number of studies. In search of faster methods for quantifying histological sections, many neuroscientists have turned to less accurate methods. The availability of automated and semi-automated microscope slide scanners has stimulated interest in semi-quantitative image analysis of 2-D images at lower magnification (40× or lower). Due to the Corpuscle Problem (see, for example, FIG. 12), the total number of 3-D cells in tissue is not equal to the total number of their 2-D profiles on tissue sections (i.e., Total N3-D cells≠Total N2-D prof). Moreover, a survey of automatic algorithms proposed to improve efficiency of cell counting methods showed these approaches do not report cell counts but rather density (number per unit area or volume) of 2-D cell profiles. The focus on density estimates leads to data biased by artifacts from tissue processing. Another problem is systematic underestimation of counts at low power due to over-projection and masking (see, for example, FIG. 3). As illustrated in FIG. 3, the low-resolution/high depth of field lens causes multiple objects to be counted as one. Hence, a high-resolution lens with low depth of fields is required for accurate counts using the optical fractionator. High magnification is needed for accurate counts due to the need to determine the section thickness, i.e., difference in distance between the upper and lower optical planes of each section, which can be done either manually or automatically. To avoid the numerous sources of stereological bias from these semi-quantitative approaches, the embodiments of the subject invention provide alternatives to current quantitative approaches for manual stereology with automated stereology.

The automated stereology of the invention can be validated and optimized using the ASA/CNN approach for the populations of high S:N stained brain cells of greatest clinical interest, such as neurons, astrocytes and microglia. These goals can be achieved by, among other things:

1. Developing standardized, high-throughput, deep learning networks for quantifying stereology parameters of neural tissues with high S:N by immunostaining. The automated stereology method of the invention with an ASA was used to quantify total number of NeuN-immunostained neurons on EDF images from mouse cerebral cortex (see, for example, Tables 3-4). These data confirm automatic stereology for total neuron number is equivalent to manual counts but with 10 times greater throughput. Comparison of both datasets with true counts from 3-D reconstruction of disector stacks (data not shown) revealed 20-30% more accuracy versus current state-of-the-art manual stereology.

However, the same ASA did not segment neurons as well in brain regions with high packing densities (CA1). With customization for each cell type in regions with low and high packing densities using the ASA method might eventually achieve similar performance as for NeuN neurons in an area with low packing density (see, for example, FIG. 13). Rather than attempting to overcome these technical barriers using the ASA approach, deep learning can be used to segment each cell type in brain regions with low and high packing densities.

TABLE 3

NeuN neuron counts by manual vs. automatic
stereology in the same disectors of four mice.
$R^2$ = correlation for manual and automatic counts.

| Collector (C) | Mouse ID | Manual | Auto. Count | $R^2$ |
|---|---|---|---|---|
| 1, 2* | 02 | 1249 | 1238 | ≥0.96 |
| 2 | 21 | 858 | 878 | ≥0.98 |
| 1 | 03 | 570 | 603 | ≥0.98 |
| 1 | 09 | 558 | 697 | ≥0.98 |

*average counts between two collectors (C1 and C2) for the same brain

TABLE 4

Comparison of manual and automatic stereology for total number (±SEM)
of NeuN neurons in neocortex of Tg4510 mice and non-Tg controls.

| Group | N | Manual Stereology | | Automatic Stereology | | % |
| | | Mean Neu-N | $SEM_{NeuN}$ | Mean Neu-N | $SEM_{NeuN}$ | $diff_{NeuN}$ |
|---|---|---|---|---|---|---|
| Non-Tg (n = 2) | 2 | 1.30E+06 | 1.18E_5 | 1.39E+06 | 7.71E+04 | +7 |
| % $diff_{NeuN}$ | | −25 | | −27 | | |

2) Developing automatic stereology software consistent with current standards of commercial programs for neuroscience research. Currently, 100% of the approximately 3500 stereology studies done worldwide use computer assisted systems that rely on manual cell counting. Many end users are reluctant to completely rely on automatic stereology to collect results that are critical to their research programs. Therefore, a confirmation step is provided in certain semi-automated stereology embodiments of the invention that allow end users to confirm or edit ground truth prior to training the model.

Other potential outcomes of the automated stereology of the invention are shown in Table 5.

TABLE 5

Expected benefits of the automated stereology
method of the claimed invention.

I. Increased efficiency of hypothesis testing of basic and preclinical research
II. Cost savings for labor, time, and equipment to complete studies
III. Greater time spent on productive research activities
IV. Faster progress toward understanding the pathology, natural history, genetics, and therapeutic management of neurological diseases and mental illnesses
V. Improved health, longevity, and quality of life The performance metrics for optimal performance of the automated stereology of the invention are shown in Table 5. The performance metric for accuracy can be assessed in comparisons to results from 3-D reconstruction, i.e., cell counts by well-trained experts of each cell type by careful counting through disector stacks. These "gold standard" counts that give the true number of cells in each disector volume can be done blind to results from automatic stereology.

TABLE 6

Performance Metrics
ACCURACY

| Algorithm performance vs 3D Gold Standard | Specificity (false positive): <5%<br>Sensitivity (false negative): <5% |
|---|---|
| Dice Similarity Coefficient (DSC) | Acceptable: DSC 0.7:<br>Poor: DSC <= 0.7 (considered misses) |
| | PRECISION |
| Inter-rater Reliability | Test/Retest Same or different user |
| | EFFICIENCY |
| Compared to Manual Stereology | Semi-automatic Mode: >10x faster<br>Fully-automatic Mode: >20x faster |

[1]Manual counts via 3D counts of cells in disector stacks (z-axis images through a known volume)
[2]For NeuN neurons, GFAP astrocytes, Iba1 microglia in neocortex and CA1 (hippocampus)

Stained tissue sections from male and female mice can be obtained. For example, stained tissue sections from normal (wild type) mice and a genetically modified mouse model (rTg4510 line) of neurodegeneration and neuroinflammation can be analyzed for the purposes of development and validation of the deep learning model. One set of every nth section will be sampled in a systematic random manner to obtain 8-12 tissue sections from regions with low (neocortex) and high (CA1) packing densities. Hardware in a stereology system can include of a Leica DM2500 microscope with low (4×), mid (40×) and high power (100×) objectives, motorized X-Y-Z stage (Prior Electronics, Rockland, MA), Sony Firewire DXC-C33 camera, and a PC computer. The following section gives the step-by-step procedure for collecting EDF images for training the CNN to segment immunostained brain cells in cortex and CA1 regions.

1) At low mag (4-5×) viewing of systematically sampled sections through the reference space, the end user outlines reference area (outlined in green) on the tissue section (see, for example, FIG. 16):

2) At high power (63×, oil), the automated stereology of the invention determines the section thickness for calculation of reference space volume.

Figure 17:
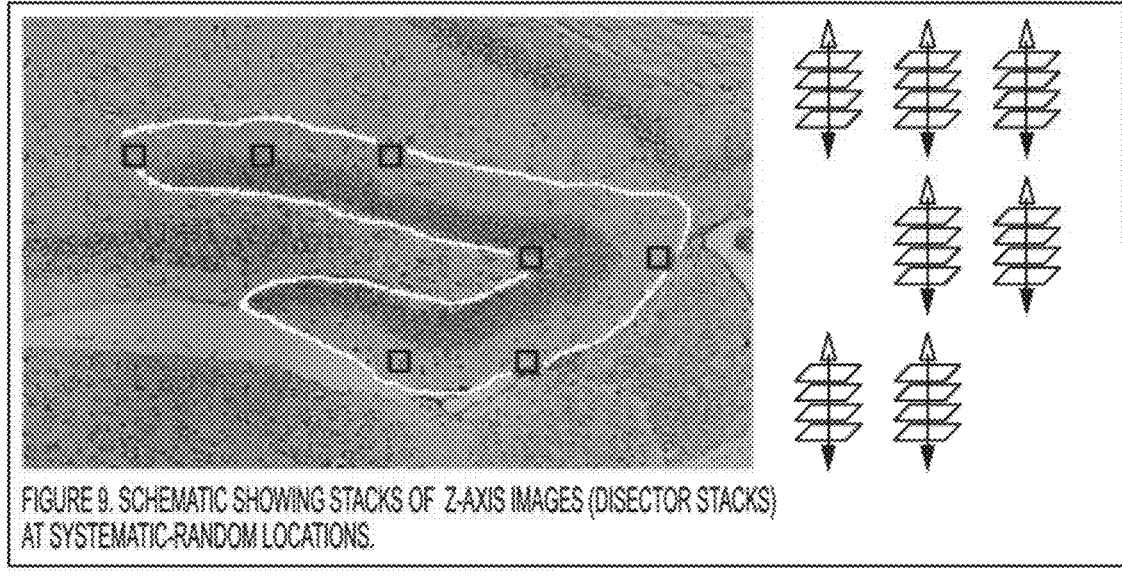
FIG. 17 shows schematic showing stacks of z-axis images (disector stacks) at systematic-random locations.

3) The automated stereology can follow a two-step process to generate EDF images from disector stacks: a) drive the motorized stage to automatically capture stacks of z-axis images (disector stacks) at about 200 systematic-random locations across x-y area of reference space for all 8-12 sections through reference volume (FIG. 17 shows 7 locations for 1 section). The x-y distance from one Z stack to the next is consistently spaced (such as 200 µm apart) and the images from the previous Z stack need not touch as there is no "stitching" involved.

Each image "slice" in the Z stack can be 1 µm thick. Tissue originally cut at 40 µm can yield 20-25 images per stack due to processing/shrinkage; and b) create EDF images from each disector stack. EDF image can capture all cells in the disector volume at their optical resolution and displays them on a 2-D image.

In certain embodiments, the automated stereology of the invention can use a deep learning architecture (Unet) neural network with 19 convolution layers, 4 max pooling layers, and 4 up-sampling convolution layers. The input-to-input layer can use gray level images of size 160*160 pixels, 27 hidden layers, and an output layer that gives binary image of the segmentation of size 160*160 pixels. As part of the preliminary data, image datasets were trained, validated, and tested using the Unet deep learning architecture. Images were cropped based on the exclusion/inclusion lines of the disector frame (see, for example, FIG. 15) and resized to be a uniform size of 160*160 pixels. Labels of the EDF images (mask images) were created to show neurons as white and the background as black (binary images). Images were augmented with rotations of 15 degrees giving 14400 and 4800 training and validation images, respectively. A second dataset of 139 images without augmentation were used as test cases. The deep learning open source platform Keras (frontend) and Tensorflow neural network library (backend) were utilized. FIG. 18 shows the predicted segmentation for the prototype software. Masks (ground truth) were created from EDF images to represent the annotation images by experts or by the ASA method. Unet was used to train and validate data subsets.

The Dice coefficient for the model was 0.905. The Dice coefficient is a measurement of similarity of two samples. In this case, the similarity of the segmentation generated from the automated stereology of the invention was compared to the segmentation from experts (ground truth).

DICE coefficient equation $$\text{Dice coefficient} = \frac{2 * |A \cap B|}{|A| + |B|}.$$

Equation 1

Optical fractionator formula $$Total N_{cell} = \left[\sum Q - \right] * F1 * F2 * F3.$$

Equation 2

The Dice coefficient formula is: where $|A \cap B|$ is the total number of true positives: pixels that have intensity of "one" in both A and B, $|A|$ is the total number of positives in the ground truth (nonzero pixels), and $|B|$ is total number of predicted positives: pixels appear as "one" in B.

To avoid potential edge effects for cells only partially visible on the inclusion line in the cropped EDF images, the predicted segmentation will be overlaid on its corresponding original EDF image before cropping. After processing the output with morphological operations to remove small regions, separate loosely connected regions, etc., Fast Radial Basis Symmetry filter (of different sizes) will be used to first detect points inside different cells. Every detected point is then used to morphologically reconstruct the map and all cells not intersecting exclusion lines are counted. The segmentation output of the CNN followed by the post processing steps will give the total number of each cell type in each disector volume (EDF image). For each brain, the total number of each cell type (Total Ncell) will be estimated according to the optical fractionator method, as we have recently shown. Since the sum of all disector volumes is a known fraction of the total volume of each region, the optical fractionator method allows for scaling from EDF images to the total region (cortex, CA1) based on the number of cells counted in the disector volumes for each brain as shown in Equation 2, where $[\Sigma Q-]$ is the sum of cells counted in all EDF images; F1 is the reciprocal of the section sampling fraction (ssf); F2 is the reciprocal of the area sampling fraction (asf); and F3 is the reciprocal of the thickness sampling fraction (tsf).

Transfer learning is one solution that may help to segment cells identified by different stains and limit the number of EDF images for training the model. With this technique, knowledge learned from previous trained tasks can be applied to new task in a related domain.

The ground truth data for training can be created with a combination of human neuron segmentation and automatic segmentation. The neuron segmentation model can be tuned to segment Iba-1 immunostained microglia from ground truth. As ground truth creation is tedious and time consuming, the minimal number of EDF images needed to tune the existing segmentation network are determined to achieve performance metrics (Table 6). The neuron segmentation network can then be tune to segment GFAP-immunostained astrocytes, again with a lower requirement for labeled training data. Due to stain variability, preprocessing can clean the ground truth masks of unnecessary blobs that could affect the segmentation model. In addition, post-processing can be used to help masking blobs below a certain threshold, after which a morphological operation for eroding and dilation could be applied to overcome variations in staining characteristics. Therefore, transfer learning, images preprocessing, and post processing are promising tools to overcome the technical risk. It is also possible to label enough images, for example, twelve to twenty thousands, to train each segmentation system without transfer learning though the labeling process time will make for slower progress. Finally, if the segmentation learned by the deep neural network is unexpectedly inadequate, different adaptive algorithms can be optimized for cell segmentation on EDF images.

Example 5

Dementia from Alzheimer's disease and other neurodegenerative conditions is a significant threat to worldwide health care systems. Embodiments of the subject invention can create, quantify and display synaptic degeneration across whole brain maps. Whole Brain Deep Learning Stereology can create extended depth of field (EDF) images from 3-D stacks of z-axis images (disector stacks) stained for presynaptic boutons through the entire brain. Segmentation and deep learning can be used on these EDF images to make automated stereology counts of synaptophysin-immunopositive boutons independent of regional boundaries across the entire brain. The numbers of synapses within each disector stack are automatically quantified for each brain and validated in the X-Y-Z planes through post-processing steps. For example, embodiments of the subject invention can be configured generate a three dimensional computer simulation of the tissue sample from a stack of z-axis images. The three dimensional computer simulation can be segmented along the x-axis and separately along the y-axis. The 3D dimensional computer segments can be visually inspected to determine a cell count or processed through software. In certain embodiments, analysis software can be configured to apply segmentation and deep learning techniques as described herein to generate automated stereology counts from the x and y planes. The stereology counts from the x, y, and z planes can be compared to validate the cell counts. In other embodiments of the subject invention, optical dissection can be performed from the x, y, and z planes of the tissue sample. As such, a synaptic map for brain can be automatically generated in one hour or less with comparable accuracy to 3-D reconstruction (gold standard), which is currently prohibited for routine studies due to the high time and labor requirement.

In certain embodiments, the invention can provide learning convolutional neural network to automatically count synaptic boutons stained with the presynaptic immuno-marker synaptophysin. Performance testing can test for accuracy, precision, and efficiency of automatic compared to manual stereology methods. The automated stereology of the invention can provide greater than 95% accuracy compared to gold standard, i.e., synapse counts by 3-D reconstruction in the same disector stacks.

A cross-sectional study can be conducted using the optimized automated stereology of the invention on synaptophysin-immunostained tissue sections from behaviorally tested young (2-3 months) and old (6-8 months) Tg4510 mice and age- and sex-matched non-tg controls. Whole brain synaptic mapscan show synaptic degeneration across brain regions associated with cognitive decline.

Whole brain maps can show regionally independent areas of synaptic innervation/degeneration in treatment and control groups. Since diffuse synaptic loss is the strongest structural correlation for dementia in Alzheimer's disease and cognitive impairments in animal models, these whole brain synaptic maps can accelerate translation of preclinical studies into potential neuroprotective therapeutics and drug discovery for Alzheimer's disease in several ways. Whole brain synaptic maps can allow for accurate, reproducible, and high-throughput screening of lead candidates. Since these synaptic maps include the entire brain the full impact of potential treatments can be identified. Automatic creation of stereology-based synaptic maps may also eliminate the subjective influence of end-user training, experience, distractions, fatigue, motivation, etc. that currently confound No/Go decisions based on qualitative histopathology. In support of rapid, broad adoption, the automated stereology of the invention can use motorized XYZ stage, bright-field microscope and digital camera hardware.

Example 6

Training deep learning models for unbiased stereology requires a large dataset generate by manual ground truth annotation that is tedious, time-consuming and expert dependent. This Example provides an active deep learning method for automatic stereology counts using a snapshot ensemble approach. The method minimizes expert verification for the generation of ground truth by providing a confidence score for each mask in an unlabeled pool that reduces user verification to only images with high information content for training the deep learning model. The deep learning method reduces the error rate to less than 1% for unbiased stereology cell counts on immunostained brain cells compared to manual stereology and requires about 25% less expert verification time compared the conventional iterative deep learning.

Understanding neurological diseases associated with cellular perturbations such as Alzheimer's and Parkinson's diseases require accurate quantitative methods for assessing the pathological process and evaluating potential treatments. The current best practices for cell quantification is unbiased stereology, a suite of mathematically rigorous and practical methods for making accurate counts of stained cells on tissue sections. Machine learning can be applied to unbiased stereology to provide automatic cell counts with enhanced accuracy, precision and throughput as compared to conventional stereology methods based on manual counts.

The ASA discussed in this Example makes stereology counts of total numbers of neurons (Neu-N immunostained neurons) by automatic segmentation and cell counting on Extended Depth of Field (EDF) images, with manual adjustments of several parameters (i.e., minimum, maximum cell size) and a Gaussian Mixture Model (GMM) threshold. One important application of an ASA is for an unsupervised generation of ground truth for training deep learning models to make automatic cell counts using unbiased stereology.

Deep neural networks have generated considerable recent interest in the biomedical field partly due to the development of the convolutional neural network (CNN), optimization algorithms, and powerful, efficient computation resources. Deep learning refers to learning methods that often start from raw data and get to a more abstract level through several hidden layers. CNNs have shown significant success in challenging tasks in image classification and recognition. A downside to deep learning neural networks is the requirement for extensive manually labeled training data, which is time-consuming, laborious and expert-dependent. To reduce this effort, this Example provides a novel combination of CNN-based U-Net architecture for stained image segmentation with active learning. The U-Net architecture provides a simple, fast, and end-to-end fully convolutional network with contraction and expansion paths to capture context and learn precise localization.

Active learning is an artificial intelligence technique that solves the labeling bottleneck by providing the most uncertain instances of unlabeled data to be labeled by a user and added to the training set. This technique can be used in many applications such as image retrieval, support vector machine based text classification, gene expression classification, and interactive image segmentation. This Example provides a novel approach for querying a pool of unlabeled data. The confidence is calculated using a snapshot ensemble of deep learning models, and the user verifies the most certain masks. A human-in-the-loop verification step was done for accepting or rejecting predicting masks, and no manual labeling involved as explained below.

With a snapshot ensemble, multiple deep learning models are saved during a single neural network training, thereby eliminating the extra-training cost for training each neural network individually. Snapshot ensemble takes advantage of training convergence of multiple local minima and uses a cyclic learning rate scheduling technique to make performance variation in the saved snapshot models. This Example provides a method based on deep learning with active learning and snapshot ensemble. The advantages of the deep learning method are: 1) reduction of human-in-the-loop verification time compared to by verifying only images of high confidence calculated using a snapshot ensemble, and 2) improving deep learning stereology cell counts (deep stereology) by adding correctly labeled images (EDF images and their corresponding masks) to the training set for the next iteration.

Unbiased Stereology:

Unbiased stereology is the state-of-the-art for biological objects quantification in tissue sections. A component of this approach is unbiased sampling (i.e., systematic-random) that avoids all sources of biased assumption such as shape, size, and orientation. Stereology cell counts use a virtual volume probe (dissector) to estimate total cell number using unbiased counting rules. Counted cells are marked manually with (blue) marks as shown in FIG. 21a.

Data Set:

The data set used in this Example comprises images sampled from the neocortex brain region of Tg4510 mice. The data set includes both control and genetically modified mice. In the latter group, neurons express mutant tau that causes neuron degeneration and activation of neuroglia cells. Sections from mouse neocortex were immunostained with NeuN for manual cell counts using the unbiased optical fractionator method. During this process, disector stacks (serial z-axis stacks 1 μm apart) were captured and saved using the Stereologer system. Table 7 shows the number of sections from which multiple stacks were obtained and converted into EDF images. The dataset for this study contains 966 EDF images and their corresponding ASA masks.

TABLE 7

| Datasets mouse ID, number of sections per mouse and total number of stacks per mouse: | | |
| --- | --- | --- |
| Mouse ID | Number of Sections | Number of Stacks |
| 02 | 8 | 113 |
| 03 | 6 | 121 |
| 14 | 8 | 90 |
| 17 | 7 | 91 |
| 29 | 8 | 135 |
| 21 | 7 | 102 |
| 24 | 8 | 103 |
| 67 | 8 | 104 |
| 09 | 6 | 107 |

Adaptive Segmentation Algorithm

The adaptive segmentation algorithm (ASA) segment cells on EDF images using multiple steps was optimized for better segmentation results. The ASA includes a Gaussian Mixture Model (GMM), morphological operations, Voronoi diagrams, and watershed segmentation. It begins with EDF images to segment NeuN stained cells using GMM where GMM uses pixel intensity for the Expectation Maximization (EM) algorithm to estimate its components followed by thresholding and morphological operations to get separate cells. Then a watershed segmentation process is applied followed by segmentation approximation using Voronoi diagrams. A smoothing process is also applied to enhance cell boundaries using a Savitzky-Golay filter. The reason to use ASA is that manual annotation does not provide mask information but instead provides a mark of what cell is being counted based on the unbiased stereology approach. An example of manual annotation is shown in FIG. 21(a).

Iterative Deep Learning

Iterative deep learning can enhance segmentation performance of deep learning models by increasing the training data examples in an iterative manner. This method uses a pool of unlabeled data (active set) to predict (i.e., generate masks) on a test set using a deep learning model. This approach requires a trained expert to verify all predicted masks generated for all EDF images in the active set (i.e., verifying the agreement of a mask and the corresponding manual annotation). If a mask is accepted, then the mask and EDF are augmented and added to the training set; otherwise, it is rejected. This process was performed for 5 iterations, and the five resulting models from all iterations were used to predict (i.e., generate masks) on the test set images, followed by post-processing and counting. Although this process is effective in increasing the number of training images by utilizing a previously trained model to generate labels (i.e., masks) for a pool of unlabeled set (i.e., active set), it requires a substantial human effort especially for large unlabeled sets and images with dense cells. Therefore, utilizing the information from predicting masks to derive a confidence score that can be used to identify the most confidence predicted masks, reduce the time and effort for an expert to verify images for training the CNN.

Methods

The main drawback of conventional iterative deep learning is that the human-in-the-loop needs to verify all deep learning models' predicted masks. To reduce a human-in-the-loop verification time, an active deep learning approach is used. The active deep learning has three steps: i) data preparation, ii) training active deep learning, and iii) testing process and postprocessing, as detailed in FIGS. 22(a)-22(c).

Data Preparation

The data set of 966 stacks of microscopy images (as described in Section III) were preprocessed to convert each image in a stack to gray, then the EDF algorithm was applied to create a single synthetic image of each stack where all cells are in-focus as shown in FIG. 21b. The ASA algorithm was used to segment cells on EDF images (ASA is described herein; ASA mask is shown in FIG. 21c). In the final step, the expert verifies the agreement of an ASA mask and the corresponding manual annotation as shown in FIG. 22a. If an ASA mask matches the manual annotation, i.e., every counted cell in manual annotation has the corresponding binary mask in the ASA mask, then the mask is accepted and moved to the training set. If at least one marked cell in the manual annotation image does not match the corresponding mask, the mask is rejected, and the EDF image is moved to the active set. A separate mouse was chosen randomly as a test set for which ground truth was manually corrected.

Training Active Deep Learning

The active deep learning approach uses the initial training set generated during data preparation, where the labels of EDF images (i.e., segmentation masks) are based on the ASA verification process as shown in FIG. 22a. The active set has EDF images from which ASA masks were rejected during the ASA verification process in the data preparation process. It is important to note that the active set images have no associated labels (masks), and thus, a deep learning model in each iteration is used to generate masks (i.e., predict on the active set). The process of active deep learning is as follows: 1) train deep learning model, 2) predict on active set, 3) compute confidence, and 4) human verification.

1) Train deep learning model: The deep learning model was trained using an off-shelf deep neural network called U-Net for 100 epochs using Keras and Tensorflow deep learning frameworks. The Adam optimizer was used with learning rate of $1\times10\square4$, while exponential decay rates for the moment estimates hyper-parameters $\beta1$ (first moment) and B2 (second moment) were set to 0.9 and 0.999, respectively. During training, a snapshot model saving approach was used (i.e., saving the model every specific number of epochs). This captures the variability of knowledge learned during training. Snapshots models were saved every 5 epochs starting from epoch 10 to epoch 100. There are 19 models $\{M1; M2; \ldots, M19\}$.

2) Predict on the active set and apply snapshot ensemble: After completing training of a deep learning model and saving the snapshot models, each model was used to predict on the active set Z, the results of prediction on an EDF image ZEDF is a probability map Zprob, where each pixel $p\in(0; 1)$. The probabilities map Zprob was thresholded at 0:5, such that each pixel $(p>0:5)=1$ (i.e., foreground), otherwise p=0 (i.e., background). Let the thresholded probability map be $Z_{trsh}$. After thresholding, the results of using snapshot model Mi where $i\in\{1; 2; \ldots, 19\}$ on the active set is $$\frac{1}{19}\sum_{i=1}^{19}Z_{thresh}^{i}$$

pixel-wise. The resultant averaged image is called $Z_{ensemble}$.

3) Compute confidence: The confidence score f of a predicted masks was calculated using corresponding ensemble mask $Z_{ensemble}$ by adding all the pixels together and then dividing by the total number of non-zero pixels $$t, f = \frac{1}{t}\sum_{i=1}^{m}\sum_{j=1}^{n}Z_{ensemble}^{i,j},$$

where m and n represents the dimensions of Zensemble.

4) Human verification: In the human verification step, the predicted active set masks that have a confidence score $f\geq0:9$ are given to the human for verification. Human verification works the same as previously done with the ASA masks, where verification of agreement between predicted masks and the manual annotation is performed. If there is an agreement between the predicted mask and the manual annotation, then the EDF/mask is accepted and moved to the train set. Meanwhile, it gets removed from the active set. If an EDF/mask does not match the manual annotation, then it gets rejected, and the EDF remains in the active set.

Testing and Post-Processing

After completing 5 iterations of the active deep learning as shown in FIG. 22b, testing of the highly trained model M19 on the test set is done as shown in FIG. 22c. Each model is a result of training U-Net on a different number of training instances where j is the iteration number and can be $j\in\{1; 2; 3; 4; 5\}$. The result of testing $$M_{19}^{j}$$

on an image XEDF is a probability map $X_{prop}$ of the same size as XEDF. Each pixel p of $X_{prop}\in(0, 1)$, which represents the likelihood of p being either part of a cell (foreground) or not part of a cell (background) based on a given threshold. The probability map $X_{prop}$ was thresholded at 0:9 to obtain the most certain pixels p that belongs to a cell by applying more restrictions on the decision of foreground and background (i.e., cell or not a cell). For instance, if $p\geq0:9$, then p=255 (i.e., p belongs to a cell), otherwise p is background (p=0). After thresholding, a post-processing step was applied for three purposes: 1) to remove small noise (blobs) in the predicted mask by removing cells of area size≤250 pixels, 2) apply unbiased stereology counting rules, by removing cells that touch exclusion lines, and 3) separate touching cells by applying the watershed algorithm. Then, the automatic counting step is done to count the total number of cells based on the unbiased stereology counting rules.

Experiments and Results

The data set disclosed here has 966 NeuN single stain disector stacks from 9 mice. The EDF algorithm was used to create an in-focus image for each stack. The number of images in the initial train set (no augmentation) is 147 images, the number of images in the initial active set is 728 images, and the number of images in the test set is 91 images. The data augmentation used in this experiment was a combination of rotation and elastic transformation, where the total number of images generated by applying elastic then rotation augmentation of a single image is 72 images (including original). When testing deep learning models on the unseen test set, the model M19 was used, which is the last model saved from snapshots models (epoch 100), whereas the ensemble of all snapshot models M1; M2; . . . ; M19 was used to compute the confidence score f of each predicted mask from the active set. The error rate to report results on the test set as shown in Equation 12, where ytrue is the number of counted cells on ground truth (manual annotation), and ypred is the number of counted cells on a predicted deep learning mask. From all 5 iteration models, the best result of the active deep learning approach is 0.27% error rate and 0.905 dice coefficient as shown in Table 8.

TABLE 8

| Best performance of deep learning (Baseline), active deep learning vs. iterative deep learning. | | |
|---|---|---|
| Deep learning approach | Error rate (%) | Dice Coef |
| Deep learning (baseline) | 3.57 | 0.906 |
| Iterative deep learning | 0.41 | 0.912 |
| Active deep learning | 0.27 | 0.905 |

The dice coefficient was calculated using Equation 13, where A is the ground truth mask, and B is the predicted mask.

$$\text{Error rate} = \frac{y_{true} - y_{pred}}{y_{true}}*100 \qquad \text{(Equation 12)}$$

$$\text{Dice} - \frac{2*|A\cap B|}{|A|+|B|} \qquad \text{(Equation 13)}$$

Table 9 contains a comparison between iterative deep learning and active deep learning in terms of a number of images verified, the number of images accepted, and time spent by a human in verification from all five different iterations. The total number of verified images by the human over all five iterations when using the iterative deep learning approach is 1761 images, which took approximately 102 minutes, whereas the total number of verified images by the human across all five iterations when using the active deep learning is 1321 images, which took about 76 minutes, where the time taken to verify each mask is approximately 3 seconds. The active deep learning methods show a reduction on verification time by approximately 25%, where the expert verifying only the most likely confident images based on a confidence score calculated using snapshot ensemble as described above in this Example.

TABLE 9

The total number of verified images, total number
of accepted images, and total verification time for each
of active deep learning and iterative deep learning.

| Compare/Deep learning approaches | Iterative Deep Learning | Active Deep Learning |
|---|---|---|
| Total verified images by human | 1761 | 1321 |
| Total accepted images by human | 544 | 401 |
| Total verification time (minutes) | 101.84 | 76.39 |

Existing algorithms could be used to generate masks for ground truth. However, the caveat is that a human-in-the-loop verification step is required to reject mislabeled images. The drawback of such verification step is that a human needs to verify the entire set of predicted masks, and thus requires time and effort given the large unlabeled data sets.

Figure 23:
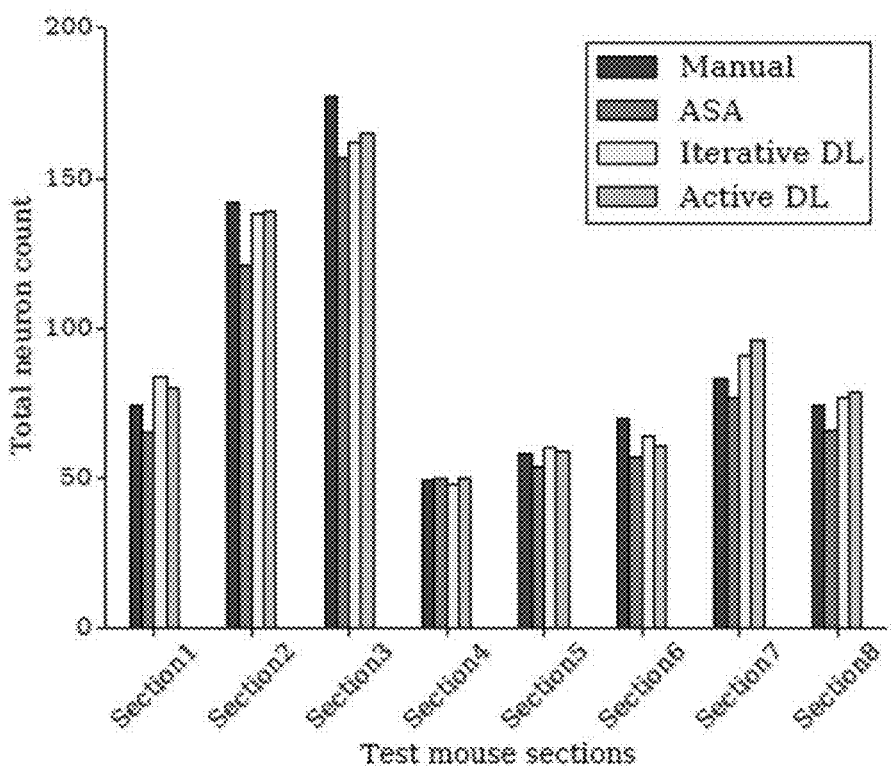
FIG. 23 shows a plot of total neuron count for test mouse sections using manual, ASA, iterative deep learning, and active deep learning methods. For each section, the leftmost bar is for manual, the second-from-the-left bar is for ASA, the second-from-the-right bar is for iterative deep learning, and the rightmost bar is for active deep learning.

Both iterative deep learning and active deep learning approaches require minimal human intervention, where a human is required only to either accept or reject based on the agreement of a predicted mask and its corresponding manual annotation. However, the active deep learning methods disclosed herein found that utilizing the snapshot ensemble approach to generate a confidence score for a predicted mask can reduce the verification time further compared to iterative deep learning since the user is getting only high confidence masks to verify. Therefore, the total time consumed in verification using the active deep learning approach is about 25% less (76 minutes vs. 102 minutes) than for iterative deep learning; otherwise, the results of both iterative deep learning and active deep learning on the test mouse were mostly similar with a slight improvement with the active deep learning as shown in Table 8. The results of using Unet with initial training data labels generated using ASA only (i.e., baseline) shows high error rate compared to iterative deep learning and active deep learning due to the lower number of images available for training as shown in Table 8. A comparison between manual, ASA, iterative deep learning and active deep learning cell counting per section of the test mouse is shown in FIG. 23, which shows that unbiased stereology based cell count of the active deep learning is relatively close to the iterative deep learning unbiased stereology cell count.

Figure 24:
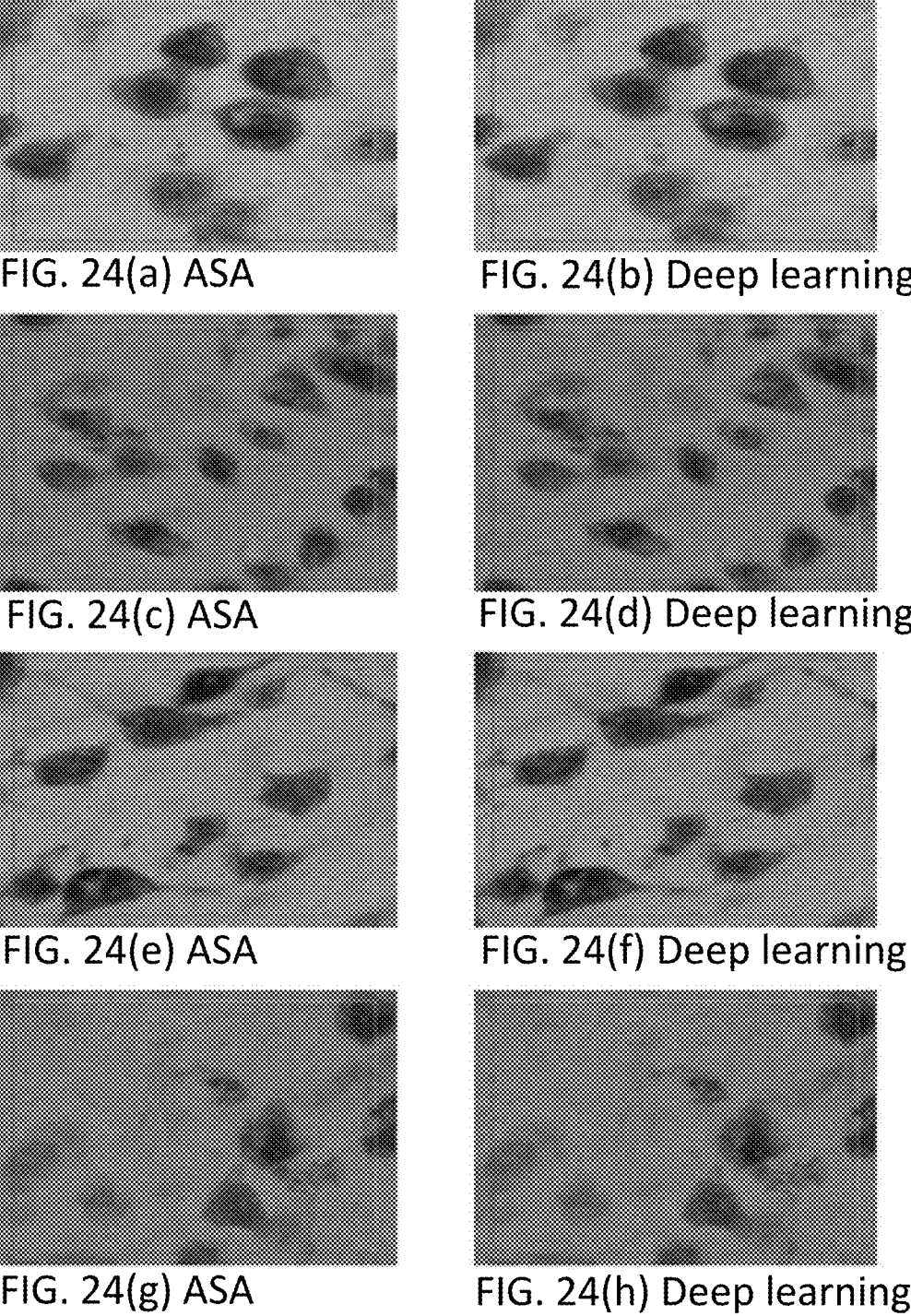
FIGS. 24(*a*) to 24(*h*) show examples from a test set, where a, c, e, and g are the ASA mask contours overlaid on manual annotation images (counted neurons have darker (blue) marks), and b, d, f, and h are the active deep learning predicted masks (iteration 5) contours overlaid on manual annotation images.

Additionally, a comparison between the ASA and the active deep learning cell segmentation and automatic cell count on images from the test set are shown in FIG. 24, where the best model's counted cell contours are overlaid on top of the manual annotation. The results show that active deep learning can segment and count cells better compared to ASA as shown in FIG. 24b, FIG. 24d, and FIG. 24h. In FIG. 24f the active deep learning result is similar to ASA result.

The findings disclosed herein provide an insight into utilizing information extracted from snapshot ensembles to reduce the human verification effort and time; and thus improving the performance of segmentation and counting of cells using unbiased stereology counting rules.

This Example presents an active deep learning algorithm for unbiased stereology cell counting that uses an unsupervised algorithm (e.g., ASA) to generate initial masks for training deep CNNs for image segmentation. A snapshot ensemble is used to compute a confidence score for each unlabeled EDF image in the active set, where the user gets only the images of higher confidence score to verify, and thus, human-in-the-loop effort in verification was reduced compared to the iterative deep learning approach. The active deep learning methods of embodiments of the subject invention showed a lower error rate of less than 1% compared to the ASA cell counting (an error rate of 11%) on unseen test mouse images. Additionally, the time consumed by the human-in-the-loop verification was about 25% lower compared to the iterative deep learning approach.

Figure 25:
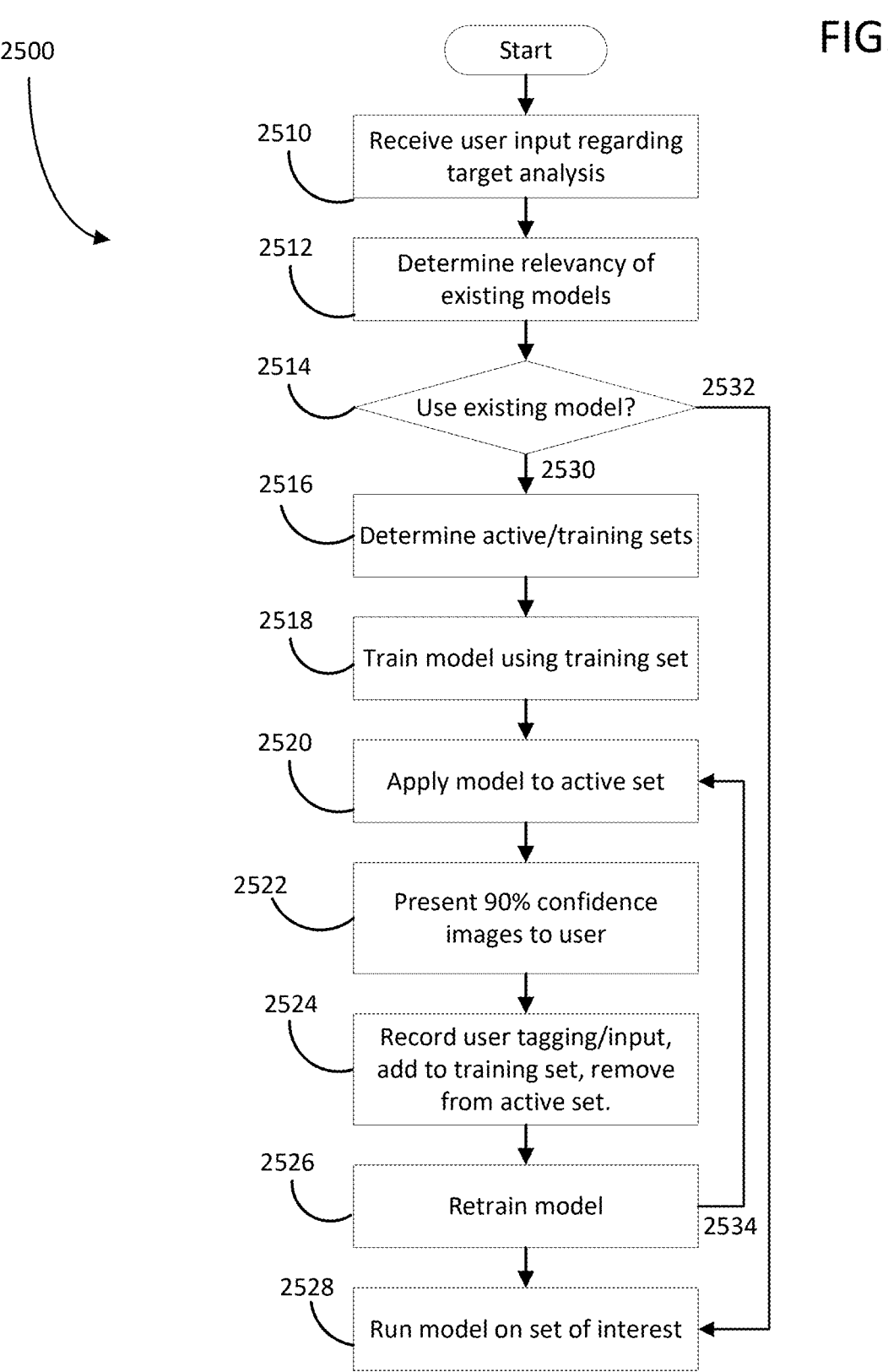
FIG. 25 is a flow chart demonstrating an example method according to the present disclosure.

Referring Now to FIG. 25, a flowchart is shown depicting an example method that may be employed to implement various techniques of the present disclosure, and leverage advantages over the prior art. The method 2500 may be employed via a system provided by a stereology company, which may comprise hardware, software, cloud services, or the like. The method begins at step 2510, at which the method receives a request or other input from a user to perform a stereology analysis. The user input may include information or metadata concerning the type of analysis requested. For example, the user input may specify that a cell count analysis is desired, a cell characterization, etc., and may specify the given type of image on which the analysis will be performed, such as: type of anatomy, expected types of cells/structures, information concerning how the images were obtained and how the structures were stained, etc. In one embodiment, the user input may be automatically determined through metadata of a set of images to be analyzed, rather than requesting a user manually enter information.

At step 2512, the user input is compared to existing deep learning models, to determine whether the existing models would be relevant to, and usable for, the given task requested by the user. For example, a set of attributes, relationships, or metadata for each model may be compared to the images for the requested set. If an existing deep learning model matching the attributes of the requested images is available 2532, then the system loads the model and runs it on the requested image set at step 2528. The result is a set of predictions for the requested 25 images, such as shown in FIG. 24. How closely an existing model must match the requested image set can be set based on a variety of factors. In one embodiment, a user may be shown a listing of closest matches (e.g., models that were trained on similar cell types, similar staining techniques, etc.), and the user can choose whether or not one of the existing models is sufficient. In another embodiment, the method may automatically determine whether a given key set of criteria overlap between the requested images and an existing model. In a further embodiment, the method may first randomly select a small test set of images from the requested set of images, and run existing models on those sets to determine the average degree of prediction confidence for the images, the median, and the number of predictions having a confidence above a certain threshold, such as 90%, 95%, 97%, or 99%. If a given model demonstrates that it can achieve high confidence of the given requested image set, then it may be utilized or suggested.

However, if an existing model is not usable 2530, then the method will begin training a more appropriate model. In various embodiments, this can take several forms. In one embodiment, the method may entail selecting one or more existing models that were trained on image sets similar to the requested image set or otherwise demonstrate likelihood of a reasonable ability to make predictions (e.g., a model demonstrated an average prediction confidence of over 75%, 80%, 85%, or 90%). Then, the requested data set is subdivided 2516 to generate a training set and an active set of images (the training+active sets may be all of the requested images or a subset of the requested images). The selected existing model is then re-trained 2518 or "tuned" using the subdivided training set (alone or in combination with an image set that originally trained the model). This retraining could be done locally on a user's computer, or via a cloud resource (in which case the training set would be sent to the cloud resource).

Alternatively, an entirely new model could be created at step 2518, rather than starting with a similar, existing model. In this case, the new model would be trained in the first instance using the subdivided training data set. In some embodiments, the training data set may be supplemented through rotation and similar techniques as described above, or other images known to have similarity to the requested image set, or other images known to be dissimilar (e.g., publicly available datasets that are not related to stereology) can be used to supplement the subdivided training set.

The trained or retrained model is then applied to some or all of the active set at step 2520. Some of the results are then presented to a user at step 2522. Preferably, in some embodiments a threshold is used to limit the number of results that are presented to an expert user according to confidence score. For example, only those results of the trained deep learning model that have a confidence score above 90% may be presented to the expert user. This could take the form of individual labels of cells/structures being presented to the user, or an entire image with multiple labels (if the average confidence score is high enough). In other embodiments, a higher percentage may be desired (e.g., for larger datasets, or instances where a high degree of accuracy/fit is desired), or a lower percentage may be desired (e.g., for smaller datasets or where a lower degree of fit is needed).

At step 2524, the expert user reviews the results and validates them. In some embodiments, the user's computer shows images having the image detection results highlighted, such as in FIG. 24. The user then simply "accepts" or "rejects" the results. The user may validate some or all of the labels of a given image. "Accepted" or validated results are then moved to the subdivided training set along with the identified result. This could be a copy of an image with a single validated structure, or only images for which all predicted/labeled structures were validated. Rejected results are returned to the active set. In other embodiments, a user may be asked to manually identify certain structures within the image, and the user's tagging may accompany the images as they are moved to the subdivided training set.

At step 2526, the method then retrains, or retunes the model using the now-supplemented training data set. This process of steps 2520-2526 may be iterative 2534 for a certain number of cycles, as described above.

At step 2528, once it has been determined that a sufficient number of cycles were performed, the model is the run on all remaining images of the requested image set and the results are presented to the user.

Figure 26:
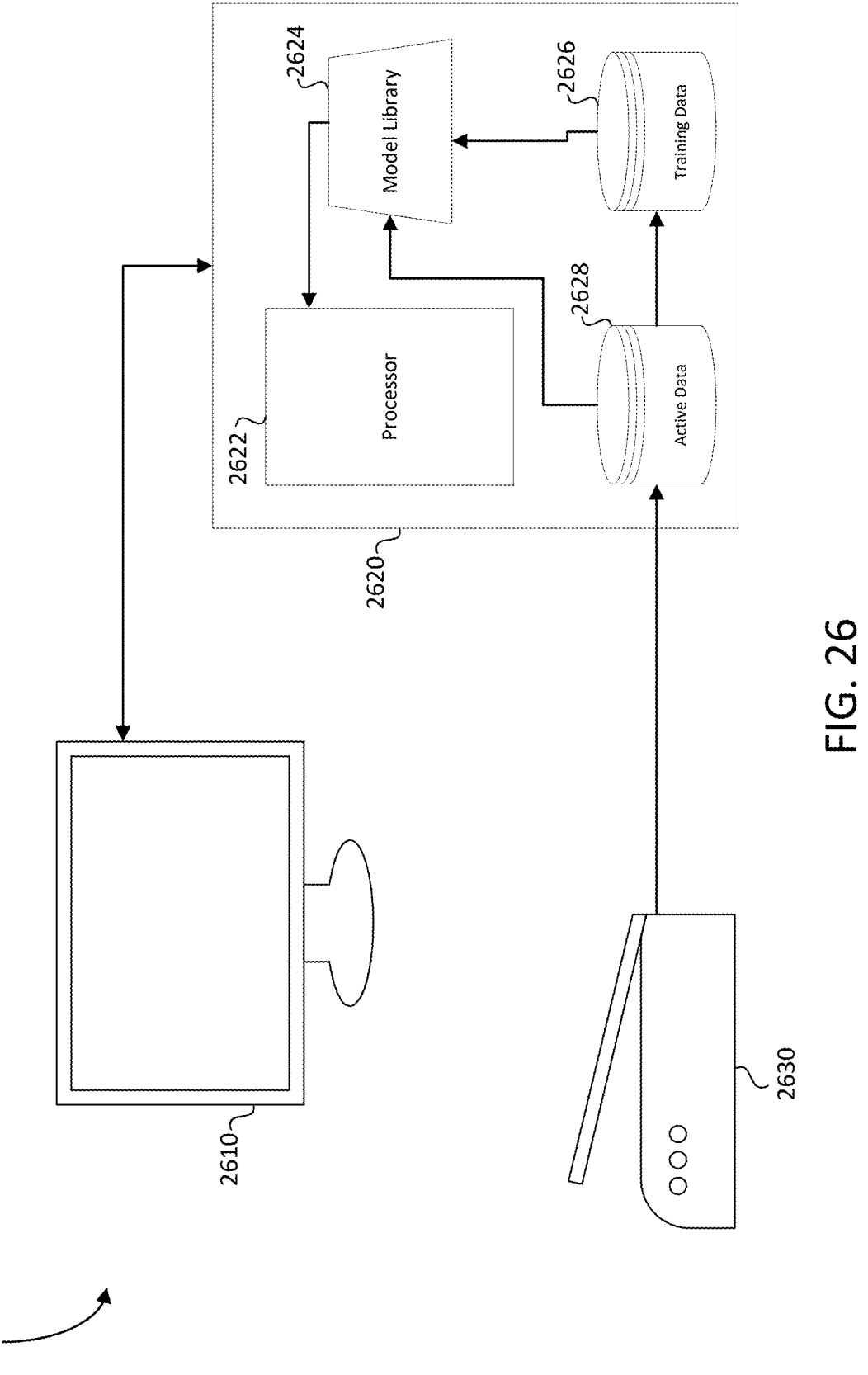
FIG. 26 is a block diagram illustrating a potential system, and associated data flow, according to an embodiment of the present disclosure.

FIG. 26 is a block diagram showing one example of a system 2600 and apparatus for implementing the various techniques and methods described herein. The system 2600 includes a user display 2610 via which a user interface is displayed. The user interface allows the user to generate or obtain a set of images for stereology analysis for a given study from equipment 2630, such as an imager, (which may be local or offsite). The user interface also allows the user to request image analysis and submit required criteria for the analysis. A computer or computational resource 2620 may be local to the user/user display 2610 or may be a remote or cloud resource. In setup (or conceptually), the computational resource 2620 includes a processor 2622 connected to a model library 2624 (which may be, for example a separate GPU or processing engine, or may simply be a repository of trained CNN models). The computational resource also comprises one or more storage locations, such as to store active data 2628 (images to be analyzed) and training data 2626. As discussed above, the training data may be simply a subdivision of the requested images to be analyzed, or may also include the images on which the models of the model library were initially trained, or may also include supplemental images.

As new deep learning models are generated per the disclosure herein, the user interface 2610 may display certain images from the active data set 2628 along with predicted results from a model of model library 2624. Depending on the user's actions, the images may be copied or moved to the training data repository 2626.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all figures and tables, to the extent they are not inconsistent with the explicit teachings of this specification. Particularly, this specification incorporates by reference U.S. Pat. No. 9,297,995 and U.S. Patent Application Publication No. 2019/0272638, to the extent they are consistent with the teachings disclosed herein.

What is claimed is:

1. A method of performing computerized stereology, the method comprising:

obtaining a data set comprising a test stack of images representing sections of a three-dimensional (3D) biological sample taken from a patient, pre-processing the test stack of images using segmentation and focus algorithms;

dividing the data set into:

a training set comprising a first stack of images depicting annotated sections of the 3D biological sample, and an active set comprising a second stack of images depicting unlabeled sections of the 3D biological sample;

accessing a library of existing deep learning models, and determining whether the library of existing deep learning models contains an existing deep learning model that was trained using labeled images having at least one metadata attribute common to at least one metadata attribute of the test stack of images, wherein the at least one metadata attribute comprises at least one of: a cell count analysis type for which the test stack of images was derived, a type of anatomy of the 3D biological sample depicted in the test stack of images, an expected type of cell depicted in the test stack of images, a type of method used to obtain the test stack of images, or a type of staining method used to prepare the 3D biological sample depicted in the test stack of images, by:

comparing data representative of the at least one metadata attribute of the test stack of images to data representative of corresponding metadata attributes of the labeled images used to train at least one existing deep learning model of the library of models, and applying at least one existing deep learning model of the library of models to the test stack of images and determining whether the at least one existing deep learning model meets an accuracy threshold for the test stack of images;

when the metadata attributes of the labeled images used to train the library of existing deep learning models do not match the at least one metadata attribute of the test stack of images, perform an active deep learning process to generate a matching deep learning model, comprising:

(i) training a deep learning model using the training set, wherein the training of the deep learning model results in an initial trained deep learning model;

(ii) applying the initial trained deep learning model to the active set, and computing a confidence score for a predicted label corresponding to each image of the active set;

(iii) displaying to a user a subset of the active set, each image of the subset having a confidence score for each predicted label from a plurality of corresponding predicted labels, the confidence score having at least a predetermined threshold;

(iv) receiving validation information from the user relating to displayed images of the subset;

(v) moving each image of the active set for which the user agreed with the predicted label to the training set to create an expanded training set;

(vi) re-training the initial trained deep learning model using the expanded training set;

when the metadata attributes of the labeled images used to train the library of existing deep learning models do match the at least one metadata attribute of the test stack of images, performing steps (i)-(vi) on the matching existing deep learning model to retrain the model; and applying the retrained deep learning model to the data set to perform a stereology analysis and display results to the user.

2. The method according to claim 1, wherein the segmentation algorithm applied to the data set comprises an adaptive segmentation algorithm (ASA).

3. The method according to claim 2, wherein the focus algorithm applied to the data set comprises an extended depth of field (EDF) algorithm.

4. The method according to claim 1, wherein the predetermined threshold is 90%.

5. The method according to claim 1, further comprising: (vii) storing a snapshot of the retrained model after step (vi).

6. The method according to claim 5, further comprising iterating steps (i)-(vii) for a predetermined number of iterations to create a snapshot ensemble.

7. The method according to claim 6, wherein the snapshot ensemble comprises snapshots of the retrained models saved every five epochs during predetermined number of iterations.

8. The method according to claim 1, wherein the deep learning model comprises a convolutional neural network (CNN).

9. The method according to claim 1, further comprising:

(vii) performing a post-processing step on the training set to remove noise, apply unbiased stereology rules, and apply a watershed algorithm.

10. The method of claim 1 wherein the training set of step (i) of training the matching existing deep learning model comprises a set of the test stack of images plus a set of images from the training set.

11. A system for performing computerized stereology, the system comprising:

an imager configured to capture a test stack of images of a three-dimensional (3D) biological sample taken from a patient, the test stack of images being a sequence of images of the 3D biological sample, and the imager being configured to capture the sequence of images of the 3D biological sample in increments having a step size along an axis of the 3D biological sample;

a processor in operable communication with the imager; and a computer-readable medium in operable communication with the processor and having instructions stored thereon that, when executed, cause the processor to perform the following steps:

accessing a library of existing deep learning models, and determining whether the library of existing deep learning models contains an existing deep learning model that was trained using labeled imaged having at least one attributes common to metadata attributes-depicted in the test stack of images, wherein the at least one attributes comprises at least one of: a desired cell count analysis, a type of anatomy, an expected type of cell, a type of method used to of obtaining the test stack of images, or a type of staining method used in of staining a preparing the depicted 3D biological sample, by:

comparing data representative of the at least one attributes of the test stack of images to data representative of corresponding attributes of the metadata corresponding to the labeled images used to train at least one existing deep learning model of the library of models, and applying at least one existing deep learning model of the library of models to the test stack of images and determining whether the at least one existing deep learning model meets an accuracy threshold for the test stack of images;

determining a confidence score having a threshold based on how closely the existing deep learning model from the plurality of existing deep learning models matches the test stack of images;

when the metadata's attributes corresponding to the labeled images used to train the library of existing deep learning models do not match the at least one attributes of the test stack of images perform an active deep learning process to generate a matching deep learning model, comprising:

i) perform pre-processing on the data set to convert each image of the test stack of images to gray and applying at least one algorithm to the data set to create a single image of the stack and to segment the single image into segments and provide respective labels for the segments;

ii) train a deep learning model to establish a ground truth using an adaptive segmentation algorithm and generate a snapshot ensemble of the deep learning model resulting in a trained deep learning model;

iii) apply the snapshot ensemble to an active set and compute a confidence score for each label of the respective labels for the segments, wherein the active set comprises a first stack of images corresponding to a pool of unlabeled sections of the 3D biological sample;

iv) display to a user all labels of the active set;

v) receive from the user an indication to select a subset of labels in the active set;

vi) move the subset of the labels to a training set comprising a second stack of images corresponding to annotated and segmented sections of the 3D biological sample; and vii) perform a testing process on the training set including the subset using the trained deep learning model.

12. The system according to claim 11, wherein the at least one algorithm applied to the data set comprises an adaptive segmentation algorithm (ASA), extended depth of field (EDF) algorithm, or both.

13. The system according to claim 11, wherein the single image of the stack is an EDF image, and wherein the labels are segmentation masks.

14. The system according to claim 11, wherein steps ii), iii), iv), v), and vii) are repeated a plurality of times before step v) is performed.

15. The system according to claim 11, wherein the deep learning model comprises a convolutional neural network (CNN).

16. The system according to claim 11, wherein the instructions, when executed, further cause the processor to perform the following step:

vi) perform a post-processing step on the train set to remove noise, apply unbiased stereology rules, and apply a watershed algorithm.

17. The system according to claim 11, wherein the at least one algorithm applied to the data set comprises an ASA and an EDF algorithm, wherein the single image of the stack is an EDF image, wherein the labels are segmentation masks, wherein the snapshot ensemble comprises a plurality of snapshot models saved every five epochs during the training, wherein steps ii), iii), iv), v), and vii) are repeated at least five times before step v) is performed, wherein the deep learning model comprises a CNN, and wherein the instructions, when executed, further cause the processor to perform the following step:

vi) performing, by the processor, a post-processing step on the train set to remove noise, apply unbiased stereology rules, and apply a watershed algorithm.

* * * * *